United States Patent
Bhaya et al.

(10) Patent No.: US 12,132,692 B2
(45) Date of Patent: *Oct. 29, 2024

(54) NETWORK BASED DATA TRAFFIC LATENCY REDUCTION

(71) Applicant: Google LLC, Mountain View, CA (US)

(72) Inventors: Gaurav Ravindra Bhaya, Sunnyvale, CA (US); Amit Agarwal, Santa Clara, CA (US); Varun Soundararajan, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 672 days.

This patent is subject to a terminal disclaimer.

(21) Appl. No.: 16/578,186

(22) Filed: Sep. 20, 2019

(65) Prior Publication Data

US 2020/0412675 A1 Dec. 31, 2020

Related U.S. Application Data

(63) Continuation of application No. 15/288,921, filed on Oct. 7, 2016, now Pat. No. 10,469,424.

(51) Int. Cl.
*H04L 51/212* (2022.01)
*H04L 41/5003* (2022.01)
(Continued)

(52) U.S. Cl.
CPC ........ *H04L 51/212* (2022.05); *H04L 41/5003* (2013.01); *H04L 43/10* (2013.01);
(Continued)

(58) Field of Classification Search
CPC ..... H04L 51/12; H04L 41/5003; H04L 43/10; H04L 67/10; H04L 67/28; H04L 67/2804; H04L 51/046; H04L 67/20
See application file for complete search history.

(56) References Cited

U.S. PATENT DOCUMENTS 6,275,806 B1 8/2001 Pertrushin
6,684,249 B1 1/2004 Frerichs et al.
(Continued)

FOREIGN PATENT DOCUMENTS

CN 1552033 A 12/2004
CN 101128819 A 2/2008
(Continued)

OTHER PUBLICATIONS

First Office Action for CN Appln. Ser. No. 201680003784.0 dated Apr. 14, 2020 (20 pages).
(Continued)

*Primary Examiner* — John W Miller
*Assistant Examiner* — Akshay Doshi
(74) *Attorney, Agent, or Firm* — MARSHALL, GERSTEIN & BORUN LLP

(57) ABSTRACT

The present disclosure is directed to a technique for reduction of latency in network traffic data transmissions. The system parses an online document to determine a messaging identifier used to communicate over an asynchronous network-based communication channel with a content provider device. The system assembles a first instance of the online content item with the messaging identifier. An intermediary appliance located on the asynchronous network-based communication channel in between the first computing device and the content provider device intercepts data packets including the electronic message The system determines a quality of the asynchronous network-based communication channel. The system blocks insertion of the messaging identifier in a second instance of the online content item prior to transmission of the second instance of the online content item to a second computing device to reduce latency by preventing additional messages from being sent to the messaging identifier.

20 Claims, 8 Drawing Sheets

(51) Int. Cl.
  *H04L 43/10*   (2022.01)
  *H04L 67/10*   (2022.01)
  *H04L 67/56*   (2022.01)
  *H04L 67/561*  (2022.01)
  *H04L 51/046*   (2022.01)
  *H04L 67/53*    (2022.01)

(52) U.S. Cl.
  CPC .............. *H04L 67/10* (2013.01); *H04L 67/56* (2022.05); *H04L 67/561* (2022.05); *H04L 51/046* (2013.01); *H04L 67/53* (2022.05)

(56) References Cited

U.S. PATENT DOCUMENTS

| | | | |
|---|---|---|---|
| 6,857,007 | B1 | 2/2005 | Bloomfield |
| 7,096,193 | B1 | 8/2006 | Beaudoin et al. |
| 7,139,728 | B2 | 11/2006 | Rigole |
| 7,428,497 | B2 | 9/2008 | Agarwal et al. |
| 7,853,255 | B2 | 12/2010 | Karaoguz et al. |
| 7,958,127 | B2 | 6/2011 | Edmonds et al. |
| 8,166,013 | B2 | 4/2012 | Bandaru et al. |
| 8,195,133 | B2 | 6/2012 | Ramer et al. |
| 8,238,540 | B1 | 8/2012 | Duva et al. |
| 8,386,386 | B1 | 2/2013 | Zhu |
| 8,483,372 | B2 | 7/2013 | Park et al. |
| 8,577,016 | B1 | 11/2013 | Duva et al. |
| 8,626,910 | B1 | 1/2014 | Lientz |
| 8,671,023 | B2 | 3/2014 | Gelin |
| 8,750,183 | B2 | 6/2014 | Smith et al. |
| 8,903,716 | B2 | 12/2014 | Chen et al. |
| 9,529,893 | B1 | 12/2016 | Deng et al. |
| 9,723,056 | B1 | 8/2017 | Kuo et al. |
| 2002/0120911 | A1 | 8/2002 | Hino et al. |
| 2002/0129011 | A1 | 9/2002 | Julien |
| 2002/0188606 | A1 | 12/2002 | Sun et al. |
| 2003/0050920 | A1 | 3/2003 | Sun |
| 2003/0055816 | A1 | 3/2003 | Paine et al. |
| 2004/0267725 | A1 | 12/2004 | Harik |
| 2005/0076013 | A1 | 4/2005 | Hilbert et al. |
| 2005/0193225 | A1* | 9/2005 | Macbeth ................ H04L 69/40 714/2 |
| 2006/0069613 | A1 | 3/2006 | Marquardt |
| 2006/0099931 | A1 | 5/2006 | Trujillo |
| 2007/0097975 | A1 | 5/2007 | Rakers et al. |
| 2007/0112656 | A1 | 5/2007 | Howe et al. |
| 2007/0127688 | A1 | 6/2007 | Doulton |
| 2007/0168506 | A1 | 7/2007 | Douglas et al. |
| 2007/0198339 | A1 | 8/2007 | Shen et al. |
| 2007/0226057 | A1 | 9/2007 | Laruelle et al. |
| 2007/0230374 | A1 | 10/2007 | Altberg et al. |
| 2008/0060013 | A1* | 3/2008 | Sarukkai ............. H04N 21/278 725/45 |
| 2008/0133540 | A1 | 6/2008 | Hubbard et al. |
| 2009/0030755 | A1 | 1/2009 | Altberg et al. |
| 2009/0063406 | A1 | 3/2009 | Golander et al. |
| 2009/0070306 | A1* | 3/2009 | Stroe .................. G06F 16/9566 |
| 2009/0119268 | A1 | 5/2009 | Bandaru et al. |
| 2009/0129571 | A1 | 5/2009 | Altberg et al. |
| 2009/0132632 | A1 | 5/2009 | Jackson et al. |
| 2010/0094860 | A1 | 4/2010 | Lin et al. |
| 2010/0169301 | A1 | 7/2010 | Rubanovich et al. |
| 2011/0066624 | A1* | 3/2011 | Turakhia ............... G06F 16/951 707/748 |
| 2011/0087646 | A1 | 4/2011 | Dalvi et al. |
| 2011/0212704 | A1 | 9/2011 | Preiss et al. |
| 2011/0238662 | A1* | 9/2011 | Shuster ................ G06F 16/248 707/E17.071 |
| 2011/0258049 | A1 | 10/2011 | Ramer et al. |
| 2012/0158484 | A1 | 6/2012 | Bhatia |
| 2012/0198056 | A1 | 8/2012 | Shama et al. |
| 2012/0265528 | A1 | 10/2012 | Gruber et al. |
| 2012/0265610 | A1 | 10/2012 | Shama et al. |
| 2013/0006771 | A1 | 1/2013 | Parikh |
| 2013/0086641 | A1 | 4/2013 | Mehr et al. |
| 2013/0103502 | A1* | 4/2013 | Mildh ................ G06Q 30/0267 705/14.64 |
| 2013/0117022 | A1 | 5/2013 | Chen et al. |
| 2013/0166578 | A1* | 6/2013 | Papineni ............... G06F 16/904 707/755 |
| 2013/0275164 | A1 | 10/2013 | Gruber et al. |
| 2013/0276069 | A1 | 10/2013 | Roberson et al. |
| 2013/0304758 | A1 | 11/2013 | Gruber et al. |
| 2013/0306249 | A1 | 11/2013 | Morton et al. |
| 2014/0133639 | A1* | 5/2014 | Berk ................. H04M 3/42263 379/93.05 |
| 2014/0180811 | A1 | 6/2014 | Boal |
| 2014/0298460 | A1 | 10/2014 | Xue et al. |
| 2015/0046421 | A1 | 2/2015 | Lisa et al. |
| 2015/0163236 | A1* | 6/2015 | Niemela ............. H04L 63/1425 726/23 |
| 2015/0172327 | A1 | 6/2015 | Wansley et al. |
| 2015/0278881 | A1 | 10/2015 | Agrawal et al. |
| 2015/0287099 | A1 | 10/2015 | Soundararajan et al. |
| 2016/0034946 | A1 | 2/2016 | Agarwal et al. |
| 2016/0156516 | A1* | 6/2016 | Nishi ..................... H04L 43/16 370/329 |
| 2016/0294846 | A1 | 10/2016 | Sharov et al. |
| 2016/0360466 | A1* | 12/2016 | Barak .................... G06Q 30/01 |
| 2017/0092278 | A1 | 3/2017 | Evermann et al. |
| 2017/0110130 | A1 | 4/2017 | Sharifi et al. |
| 2017/0110144 | A1 | 4/2017 | Sharifi et al. |
| 2017/0132019 | A1 | 5/2017 | Karashchuk et al. |
| 2017/0262545 | A1 | 9/2017 | Qu |
| 2017/0358301 | A1 | 12/2017 | Raitio et al. |
| 2018/0351897 | A1* | 12/2018 | Istrati ..................... H04W 4/14 |

FOREIGN PATENT DOCUMENTS

| | | |
|---|---|---|
| CN | 101288093 A | 10/2008 |
| CN | 101295302 A | 10/2008 |
| CN | 101951376 A | 1/2011 |
| CN | 102663105 A | 9/2012 |
| CN | 102955854 A | 3/2013 |
| CN | 105704651 A | 6/2016 |
| EP | 2 362 337 A1 | 8/2011 |
| JP | 2002-287673 A | 10/2002 |
| JP | 2007-148833 A | 6/2007 |
| JP | 2009-525548 A | 7/2009 |
| JP | 2009-531739 | 9/2009 |
| JP | 2010-512579 A | 4/2010 |
| JP | 2010-198084 A | 9/2010 |
| JP | 2013-130955 A | 7/2013 |
| KR | 10-2000-0049799 A | 8/2000 |
| KR | 10-2006-0105362 A | 10/2006 |
| KR | 1020090130364 A | 12/2009 |
| KR | 10-2012-0034600 A | 4/2012 |
| WO | WO-01/71449 | 9/2001 |
| WO | WO-2006/074052 A1 | 7/2006 |
| WO | WO-2008/073701 A2 | 6/2008 |
| WO | WO-2008/134207 A1 | 11/2008 |
| WO | WO-2009/156988 A1 | 12/2009 |
| WO | WO-2010/108157 A2 | 9/2010 |
| WO | WO-2009/125495 A1 | 7/2011 |
| WO | WO-2012/012916 A1 | 2/2012 |
| WO | WO-2013/142290 A1 | 9/2013 |

OTHER PUBLICATIONS

Office Action for KR Appln. Ser. No. 10-2018-7022202 dated Apr. 22, 2020 (19 pages).
Examination Report for EP Appln. Ser. No. 16787604.4 dated Mar. 4, 2020 (5 pages).
Examination Report for EP Appln. Ser. No. 17729601.9 dated Feb. 21, 2020 (12 pages).
Notice of Reasons for Rejection for JP Appln. Ser. No. 2019-508214 dated Mar. 9, 2020 (6 pages).
Examination Report for EP Appln. Ser. No. 16787604.4 dated Apr. 21, 2021 (5 pages).
First Office Action for CN Appln. Ser. No. 201780000959.7 dated Apr. 13, 2021 (29 pages).

(56) References Cited

OTHER PUBLICATIONS

Examination Report for IN Appln. Ser. No. 201947005658 dated Jan. 15, 2021 (7 pages).
First Office Action for CN Appln. Ser. No. 201911005329.6 dated Jul. 10, 2020 (14 pages).
Notice of Allowability for U.S. Appl. No. 15/637,138 dated Jan. 26, 2021 (3 pages).
Notice of Allowance for U.S. Appl. No. 15/637,138 dated Nov. 25, 2020 (5 pages).
Second Office Action for CN Appln. Ser. No. 201680003784.0 dated Oct. 26, 2020 (15 pages).
Final Office Action for U.S. Appl. No. 15/637,138 dated Dec. 11, 2019 (29 pages).
"Click to Text Ads in Beta? Text Message Ads" (4 pages).
"Walmart and Google to offer voice-enabled shopping", BBC News, Aug. 23, 2017 (10 pages).
"We Called it. Click-to-Text is Blowing up ADWords", Jun. 29, 2016 (1 page).
Abrams, Help users find, interact & re-engage with your app on the Google Assistant, Google Developers Blog, Nov. 15, 2017 (16 pages).
Albrecht, "Alexa, How Can You Be Used in Restaurants?", the spoon, Dec. 10, 2017 (6 pages).
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Barr, "AWS DeepLens—Get Hands-On Experience with Deep Learning With Our New Video Camera", AWS News Blog, Nov. 29, 2017 (11 pages).
Broussard, Mitchel, "Chatbot-Like Siri Patent Includes Intelligent Image, Video, and Audio Recognition Within Messages", May 11, 2017 (11 pages).
Buckland et al., "Amazon's Alexa Takes Open-Source Route to Beat Google Into Cars", Bloomberg, Feb. 27, 2018 (6 pages).
Chen, Yilun Lulu, "Allbaba Challenges Google, Amazon With New Echo-Like Device", Bloomberg, Jul. 5, 2017 (3 pages).
Close, "Amazon Echo Will Give You These Deals If You Order Through Alexa This Weekend," Web Article, Nov. 18, 2016, Time.com (2 pages).
Clover, Juli, "Amazon and Google Want to Turn Their Smart Home Speakers Into Telephone Replacements", MacRumors, Feb. 15, 2017 (5 pages).
CN Office Action for Appl. Ser. No. 201580016666.9 dated Mar. 5, 2019 (16 pages).
CN Office Action for Appl. Ser. No. 201580018473.7 dated Jan. 30, 2019 (19 pages).
Coberly, "Apple patent filing reveals potential whispering Siri functionality", Techspot, Dec. 14, 2017 (4 pages).
Collins, et al., "Can Twitter Save Itself?", cnet, Apr. 26, 2017, reprinted from https://www.cnet.com/news/twitter-q1-2017-earnings/ on Aug. 22, 2017 (2 pages).
Communication pursuant to Article 94(3) EPC for EP Appl. Ser. No. 15713078.2 dated Nov. 16, 2018 (7 pages).
Communication Pursuant to Article 94(3)EPC for Appl. Ser. No. EP 16787604.4 dated Jun. 14, 2019 (4 pages).
Cook, "A Siri for advertising: These mobile ads talk back to you," Web Article, Apr. 1, 2013, Geekwire.com (7 pages).
Cooper,Jack, "AdWords targets SMS growth with new 'click to message' feature", May 26, 2016 (5 pages).
Crist, Ry, "Logitech Harmony's Alexa Skill just got a whole lot better", cnet, Jul. 13, 2017 (2 pages).
Decision of Rejection for KR Appin. Ser. No. 10-2016-7029150 dated Jan. 29, 2018 (8 pages).
D'onfro, Jillian, "Facebook just revealed how it will make money from messages", Sep. 22, 2015, Business Insider Inc. (3 pages).
Estes, "Amazon's Newest Gadget Is a Tablet That's Also an Echo", Gizmodo, Sep. 19, 2017 (3 pages).
Examination Report for EP 15715065.7 dated Mar. 26, 2018 (10 pages).

Foghorn Labs, "10 Tips to Improve the Performance of Google Product Listing Ads," printed from Internet address: http://www.foghornlabs.com/2012/11/21/product-listing-ads-best-practices/, on Mar. 18, 2013 (5 pages).
Forrest, Conner, "Essential Home wants to be 'bridge' between Amazon Alexa, Apple's Siri, and Google Assistant," TechRepublic, May 31, 2017 (9 pages).
Foxx, Chris, "Apple reveals HomePod smart speaker", BBC, Jun. 5, 2017 (9 pages).
Gebhart, Andrew, "Google Assistant is spreading, but it needs its own 'Echo Dot'", Cnet, May 20, 2017 (6 pages).
Gebhart, Andrew, "Google Home to the Amazon Echo: 'Anything you can do . . .'", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers Newsletter "Google Assistant SDK", developers.google.com, retrieved on Jul. 12, 2017 (2 pages).
Google Inc., "Products Feed Specification," printed from Internet address: http://www.support.google.com/merchants/bin/answer.py?hl=en&answer=188494#US, on Mar. 18, 2013 (6 pages).
Google Inc., "Supported File Formats," printed from Internet address: http://www.support.google.com/merchants/bin/answer.py?hl=en&answer=160567, on Mar. 18, 2013 (1 page).
Gurman, Mark and Webb, Alex, "Apple Is Manufacturing a Siri Speaker to Outdo Google and Amazon", Bloomberg, May 31, 2017 (3 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017 (6 pages).
International Preliminary Report on Patentability for Appl. Ser. No. PCT7US2017/034247 dated Apr. 18, 2019 (13 pages).
International Preliminary Report on Patentability on Appln. Ser. No. PCT/US/2015/019950, dated Oct. 20, 2016 (8 pages).
International Preliminary Report on Patentability on AppIn. Ser. No. PCT/US2015/022167 dated Oct. 4, 2016 (8 pages).
International Search Report & Written Opinion on Appin. Ser. No. PCT/US2015/019950 dated Jun. 17, 2015 (11 pages).
International Search Report and Written Opinion of Appin. Ser. No. PCT/UC2017/034247 dated Aug. 7, 2017 (18 pages).
International Search Report and Written Opinion on AppIn. Ser. No. PCT/US2015/022167 dated May 12, 2015 (11 pages).
International Search Report and Written Opinion on Appln. Ser. No. PCT/US2016/055376 dated Jan. 11, 2017 (9 pages).
Johnston, "Amazon Whirlwind: New Echo, Plus, Spot, Connect, Fire TV Take The Stage", Twice, Sep. 27, 2017 (4 pages).
Kelion, "Amazon revamps Echo smart speaker family", BBC News, Sep. 27, 2017 (11 pages).
Kelion, Leo, "Amazon's race to make Alexa smarter", BBC News, Jul. 28, 2017 (8 pages).
Koetsier, John, "Ads On Amazon Echo: Wendy's, ESPN, and Progressive Among Brands Testing", Forbes, May 11, 2017 (3 pages).
Korean Notice of Office Action for Appln. Ser. No. 10-2016-7027997 dated Dec. 6, 2017 (18 pages).
Korean Office Action for KR Appln. Ser. No. 10-2016-7029150 dated Jul. 6, 2017 (18 pages).
KR Office Action for Appl. Ser. No. 10-2016-7027997 dated Aug. 29, 2018 (13 pages).
KR Office Action for Appl. Ser. No. 10-2016-7027997 dated Feb. 27, 2019 (8 pages).
KR Office Action for Appl. Ser. No. 10-2016-7027997 dated May 3, 2019 (13 pages).
Krishna, "Jim Beam's smart decanter will pour you a shot when you ask", engadget, Nov. 29, 2017 (3 pages).
Lacy, "Improving search and advertising are the next frontiers for voice-activated devices", TechCrunch, Dec. 20, 2017 (13 pages).
Larson, Selena, "Google Home now recognizes your individual voice", CNN Money, San Francisco, California, Apr. 20, 2017 (3 pages).

(56) References Cited

OTHER PUBLICATIONS

Lee, Take Two for Samsung's troubled Bixby assistant, BBC News, Oct. 19, 2017 (6 pages).
Lee, Dave, "The five big announcements from Google I/O", BBC, May 18, 2017 (11 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013 (17 pages).
Nieva, Richard, "Google Home and eBay can tell you how much that's worth", cnet, Mar. 8, 2017 (3 pages).
Non-Final Office Action on U.S. Appl. No. 14/879,999 dated Sep. 17, 2019 (9 pages).
Notice of Allowance on CN Appln. Ser. No. 201580016666.9 dated Sep. 4, 2019 (6 pages).
Notice of Allowance on JP Appln. Ser. No. 2016-559320 dated Jul. 27, 2017 (3 pages).
Notice of Allowance on JP Appln. Ser. No. 2016-561320 dated Jan. 29, 2018 (5 pages).
Notice of Allowance on JP Appln. Ser. No. 2018-032942 dated May 20, 2019 (3 pages).
Notice of Allowance on US Appln. U.S. Appl. No. 15/055,182 dated Jul. 30, 2019 (5 pages).
Notice of Allowance on U.S. Appl. No. 15/288,921 dated Sep. 16, 2019 (5 pages).
Novet, et al., "Amazon is getting ready to bring Alexa to work", CNBC, Nov. 29, 2017 (4 pages).
Office Action for U.S. Appl. No. 14/246,421 dated Jun. 26, 2017 (15 pages).
Office Action for U.S. Appl. No. 14/879,999 dated Aug. 11, 2017 (12 pages).
Palladino, "Garmin teamed up with Amazon to make a tiny Echo Dot for your car", ars Technica, Oct. 17, 2017 (2 pages).
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017 (10 pages).
Perez, Sarah, "The first ad network for Alexa Skills shuts down following Amazon's policy changes", Tech Crunch, Jun. 15, 2017 (8 pages).
Porter, Jon, "Amazon Echo Show release date, price, news and features", Tech Radar, Jun. 26, 2017 (11 pages).
Pringle, "'I'm sorry to hear that': Why training Siri to be a therapist won't be easy", CBC News, Sep. 24, 2017 (3 pages).
Purcher, Jack, Today Google Home's Virtual Assistant can learn its Owner's voice for Security Reasons like Apple's Patent Pending Idea, Apr. 20, 2017 (4 pages).
Sablich, Justin, "Planning a Trip With the Help of Google Home", New York Times, dated May 31, 2017 (6 pages).
Schwarts, Barry "Google AdWords testing click to SMS ad extension", Jun. 17, 2016, Third Door Media, Inc. (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges at 'Silicon Beach'", Law360, Los Angeles, California, Feb. 2, 2017 (4 pages).
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017 (2 pages).
Stackoverflow, "How do I stop Outlook from rendering an email address as a mail:to link?" asked and edited by Josh Kodroff, Jan. 22, 2010, accessed from: https://stackoverflow.com/questions/2110825/how-do-i-stop-outlook-from-rendering-an-email-address-as-a-mailto-link (13 pages).
Summons to Attend Oral Proceedings for EP Appln. Ser. No. 15715065.7 dated Apr. 24, 2019 (18 pages).
Tran, et al., "Spam Detection in Online Classified Advertisements," WebQuality '11, dated Mar. 28, 2011 (7 pages).
Unknown Author, "'Dolphin' attacks fool Amazon, Google voice assistants", BBC News, Sep. 7, 2017 (8 pages).
US Notice of Allowance for U.S. Appl. No. 15/055,182 dated Apr. 17, 2019 (8 pages).
US Notice of Allowance for U.S. Appl. No. 15/055,182 dated Mar. 1, 2019 (8 pages).
US Notice of Allowance for U.S. Appl. No. 15/288,921 dated May 8, 2019 (19 pages).
US Notice of Allowance on U.S. Appl. No. 14/246,421 dated Dec. 1, 2015 (8 pages).
US Notice of Allowance on U.S. Appl. No. 14/229,438 dated Dec. 22, 2015 (11 pages).
US Office Action for U.S. Appl. No. 14/246,421 dated May 18, 2018 (14 pages).
US Office Action for U.S. Appl. No. 14/879,999 dated Apr. 22, 2019 (2 pages).
US Office Action for U.S. Appl. No. 14/879,999 dated Jul. 3, 2018 (13 pages).
US Office Action for U.S. Appl. No. 14/879,999 dated Mar. 1, 2019 (10 pages).
US Office Action for U.S. Appl. No. 15/055,182 dated Dec. 28, 2018 (15 pages).
US Office Action for U.S. Appl. No. 15/637,138 dated Jun. 24, 2019 (29 pages).
US Office Action for U.S. Appl. No. 15/055,182 dated Aug. 16, 2018 (15 pages).
US Office Action on U.S. Appl. No. 14/246,421 dated Mar. 24, 2016 (10 pages).
US Office Action on U.S. Appl. No. 14/246,421 dated Nov. 24, 2014 (11 pages).
US Office Action on U.S. Appl. No. 14/229,438 dated Jun. 19, 2015 (13 pages).
US Office Action on U.S. Appl. No. 14/229,438 dated Nov. 12, 2014 (12 pages).
US Office Action on U.S. Appl. No. 14/246,421 dated Feb. 22, 2017 (13 pages).
US Office Action on U.S. Appl. No. 14/246,421 dated May 21, 2015 (9 pages).
US Office Action on U.S. Appl. No. 14/879,999 dated Nov. 1, 2016 (12 pages).
US Office Action on U.S. Appl. No. 15/055,182 dated Jul. 5, 2017 (4 pages).
US Office Action on U.S. Appl. No. 15/055,182 dated Sep. 18, 2017 (17 pages).
Willens, Max, "For publishers, Amazon Alexa holds promise but not much money (yet)", Digiday, Jul. 6, 2017 (5 pages).
Written Opinion for Appl. Ser. No. PCT/US2017/034247 dated Sep. 4, 2018 (11 pages).
First Chinese Office Action for Patent Application No. 202111319504.6, dated Sep. 26, 2023.

* cited by examiner

NETWORK BASED DATA TRAFFIC LATENCY REDUCTION

CROSS-REFERENCE TO RELATED PATENT APPLICATIONS

This application claims the benefit of and priority as a continuation to U.S. patent application Ser. No. 15/288,921, filed on Oct. 7, 2016, titled "Network Based Data Traffic Latency Reduction," the contents of which are incorporated herein by reference in their entirety.

BACKGROUND

Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to content item objects can be complicated by the large number of content item objects that can initiate network transmissions of network traffic data between computing devices.

SUMMARY

The present disclosure is generally directed to reducing latency in network traffic data transmissions. Electronic messages can be driven to content provider devices by configuring an online content item with a messaging extension that includes a messaging identifier, such as a phone number, username, or other handle. However, as online content items including the messaging identifier are selected for rendering on a computing device, the number of electronic messages sent to the content provider may exceed the capacity of the content provider device. Further, as messaging identifiers for the content provider change, the messaging extension might become stale or out of sync.

Systems and methods of the present disclosure can include a data processing system including one or more components that parse webpages or other online documents to identify a messaging identifier of a content provider. The data processing system can interface with a messaging system to verify that the identified messaging identifier corresponds to a content provider device that is operational to receive messages. The data processing system can add the verified messaging identifier to an instance of the content item, and provide the content item for rendering on a computing device.

Since instances of the content items can be rendered thousands, tens of thousands, or hundreds of thousands of times on different computing devices, content providers may be inundated with messages, which can introduce or increase latency in network traffic, introduce or increase latency in message response times, increase bandwidth usage, increase network data traffic, and overburden content provider devices. Systems and methods of the present solution can reduce an aggregate latency in message response times across multiple asynchronous network-based communication channels, reduce latency in message response times for a single asynchronous network-based communication channel, reduce network bandwidth utilization, or reduce processor utilization and load on a messaging service.

For example, the data processing system can determine that the quality of the asynchronous network-based communication is low, e.g. below a threshold level. The data processing system can remove the messaging identifier corresponding to the content provider device associated with the asynchronous network-based communication channel from subsequent renderings of the content item on the same or a different computing device. By removing the messaging identifier from subsequent renderings of the content item, additional computing devices may not transmit electronic messages to the content provider device having or associated with the messaging identifier because the computing device may not have access to the messaging identifier. Thus, the present solution can prevent additional computing devices from accessing the messaging identifier and transmitting electronic messages to the content provider in order to reduce the aggregate latency in message response times across multiple asynchronous network-based communication channels, reduce latency in message response times for a single asynchronous network-based communication channel, reduce network bandwidth utilization, or reduce processor utilization and load on a messaging service.

At least one aspect is directed to a system for reduction of latency in network traffic data transmissions. The system can include an online document analysis component executed by a data processing system having a processor and memory. The system can include a content generator component executed by the data processing system. The system can include an intermediary appliance component executed by the data processing system. The system can include a quality sensor component executed by the data processing system. The online document analysis component can parse an online document to determine a messaging identifier used to communicate over an asynchronous network-based communication channel with a content provider device. The content generator component can access a database stored in memory to obtain a template for an online content item linked to the content provider. The content generator component can insert, into a field of the template, the messaging identifier determined via the online document analysis component to assemble a first instance of the online content item. The content generator component can transmit the first instance of the online content item with the messaging identifier to a first computing device to cause the first computing device to render the first instance of the online content item with the messaging identifier on a display of the first computing device. The intermediary appliance can be located on the asynchronous network-based communication channel in between the first computing device and the content provider device associated with the messaging identifier. The intermediary appliance can intercept an electronic message transmitted over the asynchronous network-based communication channel between the first computing device and the content provider device. The quality sensor component can determine a quality of the asynchronous network-based communication channel. The quality sensor component can determine the quality based on a characteristic of the electronic message intercepted by the intermediary appliance. The quality sensor component can instruct, based on the quality, the content generator component to block insertion of the messaging identifier in a second instance of the online content item prior to transmission of the second instance of the online content item to a second computing device. The content generator component can transmit the second instance of the online content item to the second computing device. The content generator component can transmit the second instance to cause the second computing device to render the second instance of the online content item. The second instance of the content item can be rendered without the messaging identifier to prevent the second computing device from transmitting electronic messages to the content provider device via the asynchronous network-based communication channel.

At least one aspect is directed to a method of reducing latency in network traffic data transmissions. A data processing system can parse an online document to determine a messaging identifier used to communicate over an asynchronous network-based communication channel with a content provider device. The data processing system can access a database stored in memory to obtain a template for an online content item linked to the content provider. The data processing system can insert into a field of the template, the messaging identifier determined via the online document analysis component to assemble a first instance of the online content item. The data processing system can transmit the first instance of the online content item with the messaging identifier to a first computing device to cause the first computing device to render the first instance of the online content item with the messaging identifier on a display of the first computing device. The data processing system can intercept an electronic message transmitted over the asynchronous network-based communication channel between the first computing device and the content provider device. The data processing system can determine, based on a characteristic of the electronic message intercepted by the intermediary appliance, a quality of the asynchronous network-based communication channel. The data processing system can instruct a content generator component to block insertion of the messaging identifier in a second instance of the online content item prior to transmission of the second instance of the online content item to a second computing device. The data processing system can transmit the second instance of the online content item to the second computing device to cause the second computing device to render the second instance of the online content item without the messaging identifier to prevent the second computing device from transmitting messages to the content provider device via the asynchronous network-based communication channel.

BRIEF DESCRIPTION OF THE DRAWINGS

The details of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
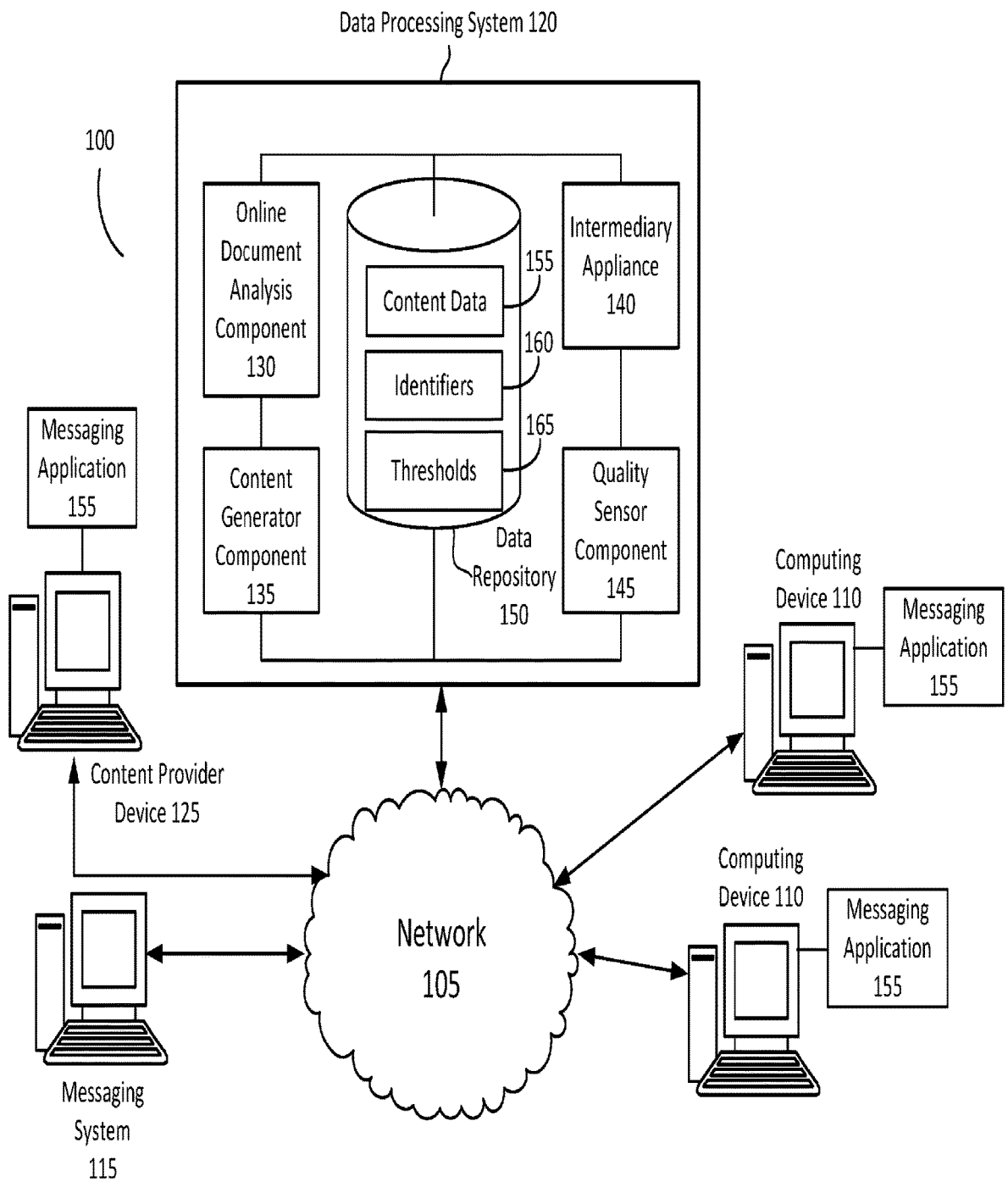
FIG. 1 is an illustration of a system for reduction of latency in network traffic data transmissions in accordance with an implementation.

The present disclosure is generally directed to reduction of latency in network traffic data transmissions. Electronic messages can be driven to content provider devices by configuring an online content item with a messaging extension that includes a messaging identifier, such as a phone number, username, or other handle. However, as online content items including the messaging identifier are selected for rendering on computing device, the number of electronic messages sent to the content provider may exceed the capacity of the content provider device. Further, as messaging identifiers for the content provider change, the messaging extension might become stale or out of sync.

Systems and methods of the present disclosure can include a data processing system including one or more components that parse webpages or other online documents to identify a messaging identifier of a content provider. The data processing system can interface with a messaging system to verify that the identified messaging identifier corresponds to a content provider device that is operational to receive messages. The data processing system can add the verified messaging identifier to an instance of the content item, and provide the content item for rendering on a computing device.

Since instances of the content items can be rendered thousands, tens of thousands, or hundreds of thousands of times on different computing devices, content providers may be inundated with messages, which might introduce or increase latency in network traffic, introduce or increase latency in message response times, increase bandwidth usage, increase network data traffic, and overburden content provider devices. Systems and methods of the present solution can reduce an aggregate latency in message response times across multiple asynchronous network-based communication channels, reduce latency in message response times for a single asynchronous network-based communication channel, reduce network bandwidth utilization, or reduce processor utilization and load on a messaging service.

The data processing system can intercept data, network packets, data packets or other data structures including electronic messages transmitted between a computing device and a content provider device over an asynchronous network-based communication channel. The data processing system can analyze the intercepted electronic messages to monitor the quality of the asynchronous network-based communication channel. The data processing system can monitor the quality by identifying characteristics of electronic messages transmitted over the asynchronous network-based communication channel. For example, the data processing system can determine characteristics such as the amount of time the content provider takes to respond to an initial electronic message sent by a computer device, the number of electronic messages sent by the content provider, the amount of time it takes the computing device to abandon the asynchronous network-based communication channel, keywords of the electronic messages, or location of the computing device.

In some cases, the data processing system can decrease, adjust, or block renderings of the content item based on the quality in order to reduce the aggregate latency in message response times across multiple asynchronous network-based communication channels, reduce latency in message response times for a single asynchronous network-based communication channel, reduce network bandwidth utilization, or reduce processor utilization and load on a messaging service.

For example, the data processing system can determine that the quality of the asynchronous network-based communication is low and remove the messaging identifier corresponding to the content provider device associated with the asynchronous network-based communication channel from being included in subsequent renderings of the content item on other computing device. Low quality can be indicated by transmission time or rendering time being above a threshold time limit, for example. By removing the messaging identifier from subsequent renderings of the content item, additional computing devices may not transmit electronic messages to the content provider device having or associated with the messaging identifier because the computing device may not have access to the messaging identifier. Thus, the present solution can prevent additional computing devices from accessing the messaging identifier and transmitting electronic messages to the content provider in order to reduce the aggregate latency in message response times across multiple asynchronous network-based communication channels, reduce latency in message response times for a single asynchronous network-based communication channel, reduce network bandwidth utilization, or reduce processor utilization and load on a messaging service.

The aggregate latency can refer to an overall latency associated with the content provider device corresponding to the messaging identifier, or one or more content provider devices corresponding to the messaging identifier. The aggregate latency can refer to network data traffic processed at the content provider device or at a gateway routing network traffic to the content provider device. For example, the content provider device may have multiple active asynchronous network-based communication channels. However, the content provider device may have reached its limit or capacity to process network data traffic or timely respond to electronic messages. By preventing new computing devices from transmitting electronic messages to the content provider device, the content provider device can process the backlog of network data traffic and return to steady state or approach steady state. Thus, the present solution can reduce the latency for each of the active asynchronous network-based communication channels associated with the content provider device to thereby reduce an aggregate latency or response time associated with the content provider device.

The present solution can reduce latency in message response times for a single asynchronous network-based communication channel by preventing additional channels from opening, thereby allowing the content provider device to process the active or ongoing communication channel. For example, a first computing device can initiate a communication channel with the content provider device. Thereafter, additional computing devices can initiate communication channels with the content provider device. At this point, the first computing device may experience delayed response times from the content provider device. Thus, the present solution can block or prevent further adding new communication channels. This can allow the content provider device to process the current network data traffic from the open communication channels. As some of the open communication channels terminate, the response time or latency for the first computing device can remove because the content provider device can have more capacity to process the network data traffic. Further, by preventing further new communication channels from initiating with the content provider device, the present solution can prevent the response time or latency from getting worse.

The present solution includes a data processing system that can reduce network bandwidth utilization, reduce processor utilization or load on a messaging system. The present solution can reduce network bandwidth utilization by limiting or throttling the number of communication channels that are active or the number of electronic messages that are transmitted. This can reduce the network bandwidth usage, as well as reduce processor utilization at the data processing system, content provider device, or messaging system.

For example, a messaging application or chat application executing on a computing device can receive, via a user interface, a message. This message can include, for example, text, symbols, words, terms, phrases, characters, or strings. The messaging application can send the message to a second device via a network. In some cases, the messaging application can send the message to a second computing device via a messaging system or messaging server. Thousands of messages per second may be directed from one computing device to another computing device via the messaging system. Furthermore, selecting and serving content items such as ads is computationally resource intensive from a data processing system perspective because the selection process includes a number of complicated operations. Thus, the selection process introduces latency in the content selection and serving flow which negatively impacts sending messages from one client computing device to another client computing device. The data processing system and other components of the present solution includes a data processing system that can prevent compounding the latency by not showing ads with messaging identifiers that are associated with content provider devices that have reached their capacity or otherwise associated with low quality communications.

FIG. 1 illustrates an example system 100 for reduction of latency in network traffic data transmissions. The system 100 can include content selection infrastructure. The system 100 can include a data processing system 120. The data processing system 120 can communicate with one or more of a content provider computing device 125, messaging system 115 or client computing device 110 via a network 105. In some cases, the data processing system 120 may not communicate directly with the messaging system 115 when a message is sent from a first computing device 110 to a content provider device 125 or a second computing device 110. The network 105 can include computer networks such as the Internet, local, wide, metro, or other area networks, intranets, satellite networks, and other communication networks such as voice or data mobile telephone networks. The network 105 can allow a messaging application or online chat application to communicate data or information between two or more devices, such as a computing device 110 and a content provider device 125. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access messages or data provided by a messaging system 115 or message service provider 115. An application 155 (e.g., messaging application or chat application) of the computing device 110 (or content provider device 125) can access a messaging system 115 to retrieve a message or data for display on a monitor of the computing device 110. The messaging system 115 can provide instructions to the application 155 executing on the computing device 110 to render the message or content. The messaging system 115 generally includes an entity that operates message or chat platform. The messaging system 115 may be operated by a third-party entity that is different from an entity that operates the data processing system 120. The messaging system 115 can interface with the data processing system 120, or the data processing system 120 can access an interface of the messaging system 115. The messaging system 115 can include at least one server that communicates with the network 105 to communicate messages, texts or other data to one or more computing devices 110. The data processing system 120 can provide instructions to the application 155 executing on the computing device 110 to render content.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the content provider device 125 (or provider device 125 or content provider 125), or the messaging system 115. The data processing system 120 can include at least one computation resource, server, processor or memory. For example, the data processing system 120 can include a plurality of computation resources or servers located in at least one data center. The data processing system 120 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The system 100 can include, access, or otherwise interact with at least one messaging system 115. The messaging system 115 can include at least one logic device such as a computing device having a processor to communicate via the network 105, for example with the computing device 110, the data processing system 120, or the content provider 125. The messaging system 115 can include at least one computation resource, server, processor or memory. For example, the messaging system 115 can include a plurality of computation resources or servers located in at least one data center. The messaging system 115 can include one or more component or functionality of the data processing system 120.

The data processing system 120 or messaging system 115 can provide messaging functionality or online chat functionality. For example, the messaging system 115 can provide instant messaging functionality, which can refer to a type of online chat that offers real-time text transmission over network 105. The messaging functionality can include a local area network (LAN) messenger that is designed and configured for use within a single local area network. The messaging system 115 can transmit messages bi-directionally between two devices when a user of the computing device provides an indication to send a message (e.g., selects a button on a graphical user interface or a button on an input device). The messaging system 115 can use push technology to transmit messages. The messaging system 115 can provide file transfer, clickable hyperlinks, Voice over IP, or video chat.

The messaging system 115 can provide multicast transmission, such as a chat room or group message or group text. The messaging system 115 can use one or more protocol to transmit messages, including, e.g., peer-to-peer (e.g., direct point-to-point transmission), or client-server (e.g., a central server retransmits messages from the sender to the communication device). For example, if the protocol includes direct point-to-point transmission between two computing devices, the chat applications executing on the respective computing devices 110 can bypass the messaging system 115 and directly transmit messages between the computing devices 110. For example, a protocol can include an eXtensible Messaging and Presence Protocol ("XMPP") that can stream extensible markup language ("XML") elements in order to exchange structured data in close to real time between two network endpoints. The XMPP protocol can transport pieces of data between two endpoints. The pieces of data can be in a structured format, such as XML.

The messaging system 115 can receive messages from a first computing device 110, or a messaging application 155 executing on the first computing device 110. The message or the messaging application 155 can indicate or identify a source identifier of the message, a destination identifier of the message, and the content of the message. The source of the message can include, for example, a username or other identification associated with the first computing device 110 or the messaging application 155 executing on the first computing device. The destination can include a username associated with a second computing device 110 or messaging application 155 executing on the second computing device 110. The messaging system 115 and messaging application 155 can use push or pull technology to transmit and deliver messages.

The data processing system 120 can include a content placement system having at least one computation resource or server. The data processing system 120 can include, interface, or otherwise communicate with at least one online document analysis component 130. The data processing system 120 can include, interface, or otherwise communicate with at least one content generator component 135. The data processing system 120 can include, interface, or otherwise communicate with at least one intermediary appliance 140. The data processing system 120 can include, interface, or otherwise communicate with at least one quality sensor component 145. The data processing system 120 can include, interface, or otherwise communicate with at least one data repository 150. The at least one data repository 150 can include or store, in one or more data structures or databases, content data 155, identifiers 160, or thresholds 165. Content data 155 can include, for example, content campaign information, content groups, content selection criteria, content item objects or other information provided by a content provider 125 or obtained or determined by the data processing system to facilitate content selection. The content data 155 can include, for example, historical performance of a content campaign. The identifiers data structure 160 can include messaging identifiers such as numerical identifiers, alpha numeric identifier, symbols, auditory identifier, touch identifier, phone number, username, tag, handle, or other identifier that can facilitate transmitting an electronic message to a device. The threshold data structure 165 can include quality thresholds such as response time threshold, spam threshold, or ratio thresholds.

The online document analysis component 130, content generator component 135, intermediary appliance 140, and quality sensor component 145 can each include at least one processing unit or other logic device such as programmable logic array engine, or module configured to communicate with the database repository or database 150. The online document analysis component 130, content generator component 135, intermediary appliance 140, and quality sensor component 145 and data repository 150 can be separate components, a single component, or part of the data processing system 120. The system 100 and its components, such as a data processing system 120, can include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information. The identity of the user of the computing device 110 can remain anonymous and the computing device 110 can be associated with a unique identifier (e.g., a unique identifier for the user or the computing device provided by the data processing system or a user of the computing device). The data processing system can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

A content provider 125 can establish an electronic content campaign. The electronic content campaign can be stored as content data 155 in data repository 150. An electronic content campaign can refer to one or more content groups that correspond to a common theme. A content campaign can include a hierarchical data structure that includes content groups, content item data objects, and content selection criteria. To create a content campaign, content provider 125 can specify values for campaign level parameters of the content campaign. The campaign level parameters can include, for example, a campaign name, a preferred content network for placing content item objects, a budget for the content campaign, start and end dates for the content campaign, a duration for the content campaign, a schedule for content item object placements, language, geographical locations, type of computing devices on which to provide content item objects. Other campaign level parameters can include, for example, a payment technique such as a cost-per-click (CPC), cost per thousand impressions (CPM), cost-per-action (CPA), cost-per-conversion, or cost per thousand conversions. In some cases, an impression can refer to when a content item object is fetched from its source (e.g., data processing system 120 or content provider 125), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the content item object for display on the computing device 110. In some cases, an impression can refer to a viewable impression; e.g., the content item object is at least partially (e.g., 20%, 30%, 30%, 40%, 50%, 60%, 70%, or more) viewable on a display device of the client computing device 110. A click or selection can refer to a user interaction with the content item object, such as a mouse-click, touch interaction, gesture, shake, audio interaction, or keyboard click. A conversion can refer to a user taking a desired action with respect to the content item objection; e.g., purchasing a product or service, completing a survey, visiting a physical store corresponding to the content item, or completing an electronic transaction.

The content provider 125 can further establish one or more content groups for a content campaign. A content group includes one or more content item objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the content item in the presence of the negative keyword on main content), bids for keywords, or budget.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider 125 can use to capture a topic or subject matter for which content item objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider 125 can provide one or more keywords and content item objects to each content group. Keywords can include terms that are relevant to the product or services of associated with or identified by the content item objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select content item objects.

The content provider 125 can provide one or more keywords to be used by the data processing system 120 to select a content item object provided by the content provider 125. The content provider 125 can identify one or more keywords to bid on, and further provide bid amounts for various keywords. The content provider 125 can provide additional content selection criteria to be used by the data processing system 120 to select content item objects. Multiple content providers 125 can bid on the same or different keywords, and the data processing system 120 can run a content selection process or ad auction responsive to receiving an indication of a keyword of an electronic message.

The content provider 125 can provide one or more content item objects for selection by the data processing system 120. The data processing system 120 can select the content item objects when a content placement opportunity becomes available that matches the budget, content schedule, maximum bids, keywords, and other selection criteria specified for the content group. Different types of content item objects can be included in a content group, such as a text content item, an image content item, video content item, audio content item, multimedia content item, call content item, or content item link. Upon selecting a content item, the data processing system 120 can transmit the content item object for rendering on a computing device 110 or display device of the computing device 110. The data processing system 120 can provide instructions to a computing device 110 to render the content item object.

Content item objects can include messaging extensions. A messaging extension can include a click-to-message feature. In some cases, the content provider 125 can provide or establish the messaging extension. However, it may be challenging to configure and maintain the messaging extension for each content item object due to the large number of content item objects, the changing nature of messaging extensions, or other complexities related to navigating the content data 155 data structure, setup user interface, or web page data.

The data processing system 120 can include an online document analysis component 130 that parses an online document to determine a messaging identifier used to communicate over an asynchronous network-based communication channel with a content provider device 125. The online document analysis component 130 can include a web crawler, spider, bot, script, executable file, or other module or component configured to identify online documents, such as web pages, online articles, online blogs, online images, icons, multimedia content, or other online documents that are linked to or otherwise associated with an account of a content provider. For example, the content provider may provide information about their domain name, landing page, or website address. The online document analysis component 130 can access the domain or landing page, and parse the subject matter on the landing page.

The data processing system 120 can apply a rule to subject matter parsed in the online document to determine a prominence of at least a portion of the subject matter. The data processing system 120 can identify one or more candidate messaging identifiers, such as phone numbers, icons, handles, usernames, tags or other identifiers that could potentially be used to initiate a text message, chat, text-based communication, electronic message, or other asynchronous communication. For example, the data processing system 120 can determine that a first messaging identifier has a greater prominence score than a second messaging identifier on the online document, and then select the first messaging identifier as the messaging identifier for the online document.

The data processing system 120 can analyze content associated with an information resource (such as an online document) of the third-party content provider to determine the rendering frequency of instances of subject matter. For example, the data processing system 120 can parse and analyze a document object model (DOM) tree of the resource, cascading style sheets (CSS) of the resource, loaded text of the resource or optical character recognition (OCR) of the source to determine a quality of a webpage (such as mobile webpage) of the resource, whether the resource includes a phone number of the third-party content provider, the amount or quality of resource content or other features of the website. The data processing system 120 can check other information (such as information stored in a resource server or web site hosting server) associated with the resource including a number of visits to the resource, user interaction history (such as download and navigation actions) associated with the resource or other information indicative of online historical information of the resource.

The data processing system 120 can determine a prominent phone number or other messaging identifier by determining a prominence score for each phone number or messaging identifier appearing in the subject matter of the information resource or online document. The data processing system 120 can compute the prominence score for a given messaging identifier (or a contact information in general) based one or more factors including the number of times that messaging identifiers appears in the subject matter of the online document, the number, format, letters or symbols of other messaging identifiers in the resource, the font characteristics (such as font size, font style, font color, underline style or any other effects such as blinking, contrast or animation effects) of the messaging identifier, the location of the messaging identifier within the resource (e.g., positioned above-the-fold, header, footer, left frame, right frame, or floating content slot), the content (such as graphics, image, text, audio or video) proximate to the messaging identifier within the online document, or a combination thereof. The data processing system 120 can select one or more messaging identifiers with highest prominence scores as messaging identifiers for contacting the third-party content provider device 125.

Using information associated with the online document, the data processing system 120 can determine whether adding a messaging extension to the third-party content item would enhance the performance (such as a conversion rate) of content item. For instance, existence of a prominent messaging identifier (e.g., a messaging identifier with a prominence score greater than a threshold) in the content of the resource, a poor quality of the resource or a rendering frequency thereof (such as a mobile webpage), low online activity associated with the resource, or any combination thereof can indicate that an added click-to-message feature may improve the performance of the content item. The data processing system 120 can consider other information provided by the third-party content provider (such as information indicative of a type of operation, size of the operation, physical location of the operation or whether the third-party content provider subscribed to a service of automatically adding a click-to-message function to content items) when determining whether or not to provide the content item for rendering with call functionality.

Figure 2:
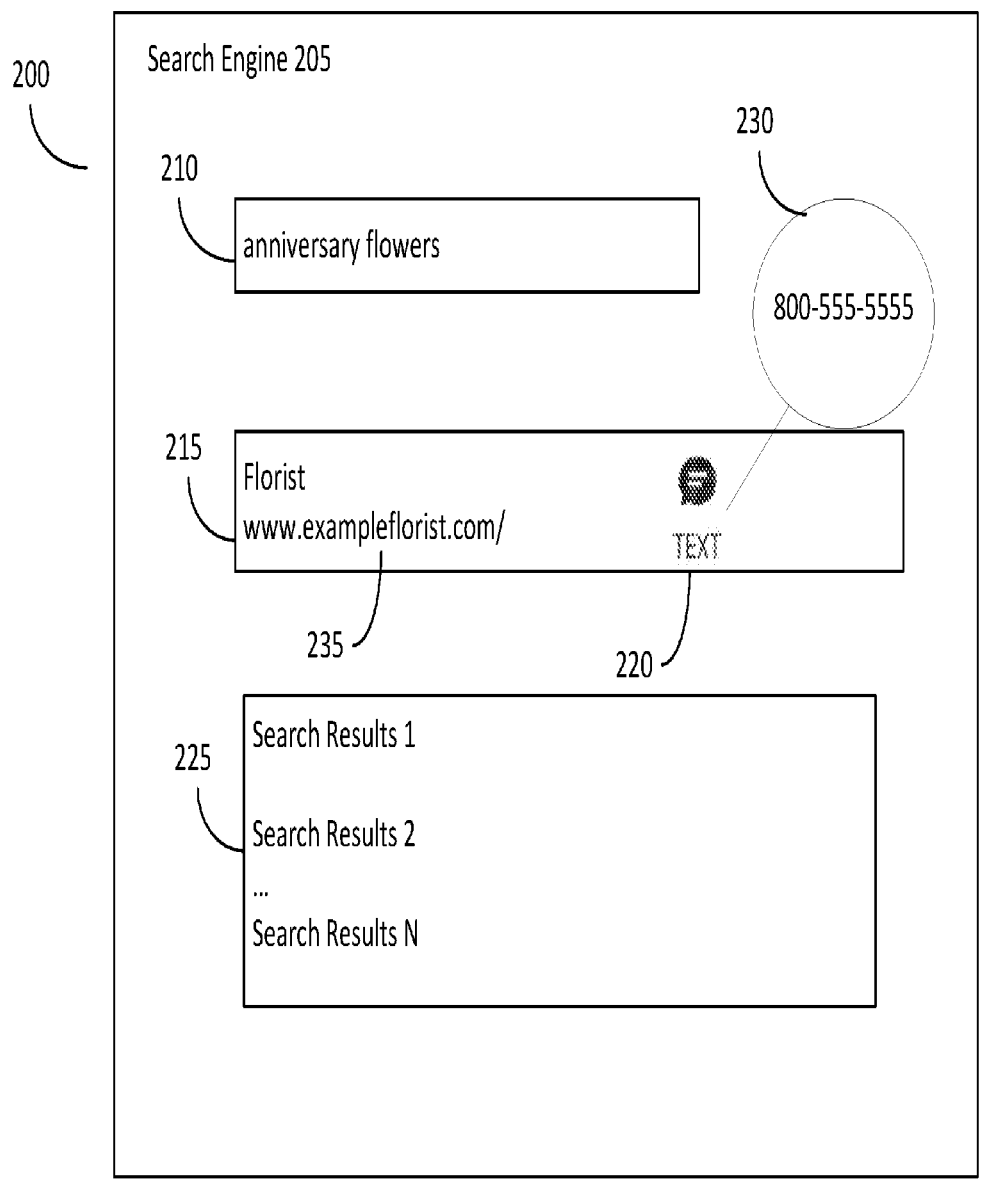
FIG. 2 is an illustration of a content item object having a messaging extension.

Upon determining that an added messaging feature may improve the performance of the content item and befit the third-party content provider, the data processing system 120 can generate a messaging extension (e.g., messaging extension 220 illustrated in FIG. 2). The messaging extension can include a message icon and computer executable instructions for initiating an electronic message to a messaging identifier responsive to actuation of the message icon.

In further detail, the online document analysis component 130 can identify a content item and a uniform resource locator ("URL") provided by a content provider in the content data 155. The URL can identify a resource such as an online document. The online document analysis component 130 can load the resource identified by the received URL. The on line document analysis component 130 can detect a plurality of contact information, such as messaging identifiers, from the loaded resource. The online document analysis component can determine, compute or calculate a prominence score for each contact information, select one of the plurality of contact information based on the calculated prominence scores, and associate the selected contact information with the content item. In some cases, the online document analysis component 130 can determine a domain of the URL and filtering a portion of the loaded resource.

The data processing system 120 can filter out contact information to identify messaging identifiers configured or operational to initiate electronic messages. For example, the data processing system 120 can identify some or all contact information, and then perform a verification procedure to determine if the contact information is operational to transmit electronic messages.

To identify the messaging identifiers for a content provider, the data processing system 120 can receive a content item and a URL from a content provider. The URL can identify a resource. The content item is associated with the URL. The resource identified by the URL may be the landing page of the content item. The content item and the URL may be sent from a third-party content provider 125 and received at the data processing system 120. The URL can be received and the content item is generated from the resource identified by the received URL. For example, the resource referenced by the URL may be loaded, and various elements from the resource may be combined to generate the content item. The content item can be received and the content item contains the URL.

The URL can reference a resource that is hosted on a web server or a server of the third-party content provider 125. The received URL may identify a resource that is a web page or a landing page for the received content item. The resource may be maintained by the third-party content provider 125. The content item may be an ad of a product or a service that is offered on the resource by the third-party content provider 125. For example, the third-party content provider 125 may be an online retailer, the resource may be a web page of the online retailer, and the content item may be an ad for the web page.

The data processing system 120 can determine a domain of the URL. The data processing system 120 can identify the domain of the URL by parsing the URL as a text string. The data processing system 120 can parse the URL to identify the domain of the URL. The data processing system 120 use regular expressions, text searching, or pattern recognition to identify a domain of the URL.

The domain can be a root domain or a subdomain. For example, the URL may be https://sub.example.com, in which "example" is the root domain and "sub" is the subdomain. Some URLs may have multiple levels of subdomains. A plurality of domains may be determined, each domain of a different domain level. For instance, a root domain and a subdomain of the URL may be determined. The data processing system 120 can identify some or all subdomains linked or associated with a root domain using a resource hierarchy tree or otherwise crawling or searching for resources associated with the root domain. One of the domains can be selected based on the number of resources available in each domain.

The data processing system 120 can select the messaging identifier from one or more domains associated with the root domain. For example, the data processing system 120 can parse multiple subdomains to identify a messaging identifier. The data processing system 120 can start with one or more lowest level domains and progress up the hierarchy. If no messaging identifier is extracted from the lowest level domain, or if no messaging identifier is selected from a plurality of contact information, then the data processing system 120 can access a higher level domain. This process can repeat until the root domain is reached.

The domain can be used to find a plurality of URLs under the domain, each plurality of URL identifying a resource that is less than a predetermined number of arcs from the resource identified by the received URL. An arc is a link or a reference from one resource to another resource. For instance, a web page can include a hyperlink to another web page. The predetermined number of arcs may be set to limit the maximum distance in links from the resource identified by the received URL, thereby limiting the number of contact information that are detected from a plurality of resources referenced by the plurality of URLs. For instance, if the predetermined number of arcs is set to 1, the plurality of URLs would include the received URL and one or more URLs that are referenced by the resource identified by the received URL. The resource identified by the received URL can be loaded first, and if no contact information is detected, each resource identified by the plurality of URLs may be loaded and contact information may be detected from each resource. If no contact information is detected in the resources with a distance in links of 1, then a plurality of resources are loaded with a distance in links of 2. The distance is increased until the predetermined number of arcs specifying the maximum distance in links is reached, until contact information is detected, or until contact information with a prominence score above a threshold score is detected.

A web crawler or a bot can crawl or navigate to the received URL and find a plurality of URLs under the domain. For example, a web crawler may load the resource referenced by the received URL and find one or more URLs in the resource. The web crawler may then load one or more resources referenced by the one or more URLs, and find another set of URLs in each of the one or more resources. This repeats a predetermined number of times, corresponding to the predetermined number of arcs.

A database or a memory element can store the plurality of URLs. The database or a memory element may be part of a search engine, the content item data processing system 120 or a third-party content server 125. The database or a memory element may be queried with the domain and the predetermined number of arcs to retrieve the plurality of URLs. For instance, the database may store a directed graph of a plurality of URLs under a domain, the nodes in the directed graph representing URLs under the domain, and the arcs representing links between the resources identified by the URLs.

The data processing system 120 can load the online document or resource as a text string into memory, for instance as a HyperText Markup Language (HTML) file. The data processing system 120 can parse the resource into an object tree and render it as a web page.

For example, the resource can be parsed into an object tree, such as a document object model (DOM) tree. The DOM tree may be a hierarchical model of a particular resource. The DOM tree may include image information (e.g., image URLs, display positions, display sizes, or alt text), font information (e.g., font names, sizes, or effects), color information (e.g., RGB color values or hexadecimal color codes) and text information for the resource.

In some cases, the data processing system 120 can render the resource to create a snapshot image of the resource. The snapshot image can be a visual representation of a particular resource. The snapshot image may illustrate the visual appearance of the resource as presented on a user interface device (e.g., an electronic display screen, a computer monitor, or a touch-sensitive display,) after rendering the resource. The snapshot image may include color information (e.g., pixel color, brightness, or saturation). The snapshot image can include a picture file having any viable file extension (e.g. .jpg, .png, or .bmp).

The data processing system 120 can detect a messaging identifier from the loaded resource. The data processing system 120 can filter out portions of a resource so as not to select a messaging identifier from a portion, such as a comments section of a webpage. For example, where the resource is loaded as text into memory, regular expressions, pattern recognition, and other text search can be used to find the messaging identifier. If the data processing system 120 parses the resource into an object tree and rendered, contact information may be detected from the rendered resource via, for instance, optical character recognition. If a plurality of resources are loaded, the messaging identifier may be an aggregation of some or all contact information that are detected in each of the plurality of resources.

A messaging identifier of a third-party content provider 125 can be detected in the resource or the plurality of resources. A messaging identifier can include a phone number, a username of a messaging system 115, electronic mail address, tag, handle, symbol, or alphanumeric identifier. The data processing system can identify a predetermined type of messaging identifier, such as a messaging identifier having a unique format corresponding to a type of messaging system 115. For example, only phone numbers may be detected from the resource. The data processing system 120 can use different sets of rules to detect the messaging identifier depending on the type of contact information. For instance, one set of rules may be used to detect a phone number, and another set of rules may be used to detect a username.

The data processing system 120 (e.g., via online document analysis component 130) can determine a prominence score for a messaging identifier. The data processing system 120 can determine the prominence score of the messaging identifier by calculating or searching for one or more signals associated with the messaging identifier. The data processing system 120 can compute, determine or calculate a signal score for each signal associated with messaging identifiers. Signals may be of different types. The data processing system 120 can determine signal scores for different types of signals, or determine a signal score based on different types of signals. The data processing system 120 can identify different types of signals by one or more of: searching through the loaded text of the resource, analyzing the object tree or CSS of the resource, or analyzing the OCR of the rendered resource. For example, the data processing system 120 can use the DOM or the snapshot image of the loaded resource to find the one or more signals and calculate the signal scores.

The data processing system 120 (e.g., via online document analysis component 130) can identify a type of signal that includes a number of times the contact information is detected on the resource. For instance, a phone number may be shown several times on a web page. The number of times a messaging identifier appears on the resource may be proportional to a signal score. The plurality of messaging identifiers holds duplicates, such that number of times contact information is stored in the plurality equals the number of times the contact information appears in the resource.

The data processing system 120 (e.g., via online document analysis component 130) can identify a type of signal that includes a number of other contact information on the resource. For instance, a phone number may be the only contact information on the web page. The number of other contact information on the resource may be inversely proportional to a signal score.

The data processing system 120 (e.g., via online document analysis component 130) can identify a type of signal that includes a number of other messaging identifiers of the same type as the contact information associated with the signal. For instance, a signal score of the phone number in the web page may be the number of other phone numbers in the web page. The number of other contact information of the same type as the messaging identifier associated with the signal may be inversely proportional to a signal score. For instance, if a web page has a phone number and an email address and there are no other phone numbers in the web page, the signal score may be a maximum signal score value for this type of signal.

The data processing system 120 (e.g., via online document analysis component 130) can identify a type of signal that includes a textual emphasis of the messaging identifier in the resource. The textual emphasis can include a font size, bold, italic, oblique, underline, color, contrast, or blinking, for example. A type of signal can also be a relative textual emphasis of the contact information compared to the surrounding contents in the resource. For instance, a web page may include a phone number of font size 16, and the text surround the phone number may be of font size 12. In another instance, a web page may include a phone number in bold and a surrounding text that is not in bold. In instances where the contact information is detected from the text of the loaded resource, the textual emphasis may be detected from a tag or a node of the object tree or a corresponding portion of the CSS. In instances where the contact information is detected from the rendered resource, the textual emphasis may be detected by analyzing the rendered resource, such as using OCR on the snapshot image.

The data processing system 120 (e.g., via online document analysis component 130) can identify a type of signal that includes a location of the messaging identifier within the resource. Some locations within the resource have a higher signal score compare to other locations within the resource. For instance, a phone number located at the top of a web page may have a higher signal score than another phone number located at the bottom of the web page. The location of the contact information may be determined by using the rendered resource such as the snapshot image, or by using the object tree.

The data processing system 120 (e.g., via online document analysis component 130) can identify a type of signal that includes or be based on content proximate to the messaging identifier within the resource. The content proximate to the messaging identifier can be graphical, text, image, audio, or video content, for example. The content proximate to the contact information may be found using the object tree or the rendered resource. For object trees, a content may be proximate to messaging identifier if the content is a parent, a sibling, or in the same node as the messaging identifier. For rendered resources, a content may be proximate to the messaging identifier if the content is within a predetermined spatial distance or adjacent to the messaging identifier in the snapshot image. The spatial distance may be, for instance, an absolute distance or relative spatial distance as compared to a dimension of the snapshot image. For instance, a content may need to be within 100 pixels within contact information to be considered proximate. In another instance, a content may need to be within 10% of the relative distance compared to a width of the rendered snapshot. After the content proximate to the contact information is found, the content may be used to determine a signal score. For instance, text "text" or "SMS" may be found proximate to one phone number, the text "chat" may be found proximate to a chat icon or username, and the text "fax" may be found next to a second phone number. The second phone number next to the word "fax" may have a lower signal score than the phone number next to the word "SMS." The word "fax" may indicate that the content provider does not intend to be messaged on the corresponding phone number, and the word "SMS" may indicate that the content provider does intend to be messaged on the corresponding phone number.

The data processing system 120 can analyze the content item in determining a signal score based on a content proximate to the contact information within the resource. For instance, the resource may contain a phone number next to the word "service" and another phone number next to the word "sales." If the received content item includes the text "Text our sales representatives today!", then the data processing system 120 can determine that the phone number next to the word "sales" has a higher signal score. If the received content item includes the text "Text for service", then the data processing system 120 can determine that the phone number next to the word "service" has a higher signal score.

The data processing system 120 can use one or more keywords associated with the received content item determining a signal score based on a content proximate to the messaging identifier within the resource. The keywords may be used to select a content proximate to the contact information within the resource. For example, the content item may be associated with a keyword "flower." A phone number may be next to the word "order flowers" in the rendered resource. The data processing system 120 can determine a higher signal score for content that matches (e.g., exact match, phrase match or broad match) with the keyword and for content that is closer in spatial distance.

The data processing system 120 can identify a type of signal based on a prominence of a content proximate to the contact information within the resource. The content proximate to the contact information may be graphical, text, image, audio, or video, for example. The data processing system 120 can determine the prominence of the content by other types of signals of the content, such as location, size, relative size compared to the resource, color, or contrast, for example. The content proximate to the contact information can be an image specified by a HTML img tag, and the phone number may be in the alt text attribute of the img tag. In another instance, the contact information may be part of the image and detected from the rendered resource.

The data processing system 120 can determine or compute a prominence score of contact information (e.g., messaging identifier) from the one or more signal scores. The data processing system 120 can weight, scale or normalize signal scores based upon the type of signal, type of content item, or content provider data. For instance, each signal score may be scaled such that signal scores of different signal types may have a same range of possible values. The one or more signal scores may be combined or summed to a prominence score. For instance, a prominence score of a phone number may be calculated by combining the signal scores based on location, textual emphasis, and content proximate to the phone number. The prominence score can be a weighted sum of the signal scores. In some examples, where a plurality of resources are loaded, a prominence score associated with a contact information may be weighted by the data processing system 120 based on the number of arcs from the resource identified by the received URL to the resource that contains the contact information. For instance, a first phone number may be detected on the landing page, and a second phone number may be detected on a web page that is linked from the landing page. The data processing system 120 can multiply the prominence score for the first phone number by one weight value, such as one, while the second phone number may be multiplied by another weight value, such as 0.5. The weight value of a prominence score can be a decreasing function of the number of arcs from the resource identified by the received URL. For instance, the function may be an exponential decay or linear decay function. The prominence score of each contact information may be associated with the corresponding contact information. For instance, a memory element may store each prominence score with the corresponding contact information. In another instance, each prominence score may store a reference or a pointer to an associated contact information. The data processing system 120 can break a tie between messaging identifiers having equal prominence scores by using a rule or heuristic technique, such as selecting messaging identifier that is located at the top of the page, largest font, or based on some other rule.

The online document analysis component 130 can apply a machine learning technique to subject matter parsed in the online document to determine a prominence of at least a portion of the subject matter. The data processing system 120 can determine, based on the prominence, the messaging identifier as including the at least the portion of the subject matter. The machine learning technique can include a model, feedback model, probabilistic technique, semantic analysis, or regression model, or other technique that facilitates the data processing system 120 identifying operational messaging identifiers.

For example, a first online document can include an embedded hyperlink to a second online document. The data processing system 120 can parse the first online document to identify an embedded hyperlink to a second online document. The data processing system 120 can access the second online document using the embedded hyperlink to parse subject matter of the second online document. The data processing system 120 can determine, based on the subject matter parsed in the second online document, a second messaging identifier. The data processing system 120 can apply a rule to the first messaging identifier to determine a first prominence. The data processing system 120 can apply the rule to the second messaging identifier to determine a second prominence. The data processing system 120 can select, based on a comparison of the first prominence and the second prominence, the first messaging identifier for insertion in the first instance of the content item.

Thus, the data processing system 120 can select one of the plurality of messaging identifiers based on the calculated prominence scores. The data processing system 120 can select one of the plurality of messaging identifiers associated with the highest prominence score as compared to other prominence scores of the plurality of messaging identifiers. The messaging identifier referenced by or associated with the selected prominence score can be selected among the plurality of messaging identifiers.

The data processing system 120 can assign a messaging identifier associated with a data processing system as a proxy or virtual messaging identifier in place of the messaging identifier determined from the online document. For example, the data processing system 120 can include an intermediary appliance 140. The data processing system 120 can assign a proxy or virtual messaging identifier associated with the intermediary appliance 140. The intermediary appliance 140 can include hardware, software or a combination of hardware and software. The intermediary appliance can include or provide a bridge service that receives electronic messages from a computing device 110 and forwards those electronic messages to a content provider. The intermediary appliance 140 can forward the electronic message to the messaging identifier of the third-party content provider retrieved from the online document. The forwarded electronic message can be received at a content provider device 125 associated with the third-party content provider. The content provider device 125 can include a phone device, a mobile phone, a tablet, a computer device, or other electronic device capable of receiving electronic messages.

The data processing system 120 or intermediary appliance 140 can assign a static phone number for the intermediary appliance 140 to the messaging icon. A static assignment of a messaging identifier can include assigning a single phone number to multiple instances of the content item or to various content items. The data processing system 120 can dynamically assign a messaging identifier associated with the intermediary appliance 140 to the messaging icon. A dynamic assignment of a messaging identifier allows for determining the content item or an instance thereof based on the messaging identifier of the intermediary appliance 140 assigned to the messaging icon. For example, the assignment of the messaging identifier associated with the intermediary appliance 140 can include dynamically selecting a messaging identifier from a pool or list of messaging identifiers associated with the intermediary appliance 140 each time an instance of the content item with messaging functionality is to be provided for rendering.

The data processing system 120 (e.g., via a quality sensor component 145) can determine whether the messaging identifier corresponds to a device or content provider device 125 that is operational to receive electronic messages. For example, the data processing system 120 can ping, prior to insertion of the messaging identifier in the first instance of the content item, via the asynchronous network-based communication channel, the content provider device 125 corresponding to the messaging identifier. The data processing system 120 can receive, from the content provider device 125, a response to the ping. The data processing system 120 can verify, based on the response, that the content provider device is operational to receive electronic messages over the asynchronous network-based communication channel. The response can be verified if it includes text in a proper format or if it includes a predetermined text or indication, such as "received" or "operational" or "yes". Responsive to the verification of the content provider device 125, the data processing system 120 can authorize the content generator component 135 to insert the messaging identifier in one or more instances of the content item.

The data processing system 120 can determine whether to add the messaging identifier based on whether the messaging identifier is already associated with the content item in the content data 155. For example, the data processing system 120 can retrieve, from the database 150 stored in memory, a plurality of messaging identifiers linked to an online account associated with the content provider device 125 or content item. These messaging identifiers may have been previously provided by the content provider 125 or otherwise previously added by the data processing system 120. These messaging identifiers may have been previously verified and authorized by the data processing system 120. The data processing system 120 can then compare the new messaging identifier to be added with the previous messaging identifiers, and if the new messaging identifier is missing from the previously added messaging identifiers, the data processing system 120 can determine to update the database storing the plurality of messaging identifiers to include the messaging identifier and authorize the messaging identifier for electronic messages. By not adding duplicate messaging identifiers, the data processing system 120 can reduce memory storage or memory waste in database 150.

The data processing system 120 can remove messaging identifiers from the database 150 or content data 155 data structure to recover memory and reduce memory wastage, as well as reduce bandwidth waste associated with transmitting electronic messages to non-responsive or expired messaging identifiers. For example, the data processing system 120 can determine that a messaging identifier has been removed from an online document. The data processing system 120 can determine that the prominence score is much lower for the messaging identifier, or that the messaging identifier does not appear on the online document.

Responsive to the determination of the removal of the messaging identifier from the online document, the data processing system 120 can update the database storing the plurality of messaging identifiers to remove the messaging identifier to block the messaging identifier from insertion in subsequent instances of the content item. Thus, the data processing system 120 can recover memory or storage space in the database 150, and reduce wasted bandwidth usage and other resource utilization associated with sending electronic messages to expired, inactive, or disassociated messaging identifier that do not correspond to the content provider 125 of the online document.

The data processing system 120 can include a content generator component 135. The content generator component 135 can inset or associate the messaging identifier with the content item or an instance of the content item. The content generator component 135 can provide or transmit the content item or instance of the content item for rendering on a computing device 125.

The data processing system 120 can access a database stored in memory to obtain a template for an online content item linked to the content provider. The template can be stored in content data 155. The data processing system 120 can identify one or more fields in the template. The data processing system 120 can insert, into a field corresponding to messaging identifiers, the selected messaging identifier. The data processing system 120 can then assemble a first instance of the online content item, or provide instructions to a computing device to assemble or render the first instance of the content item with the messaging identifier.

The data processing system 120 can provide the messaging identifier to the computing device 110 separate from other subject matter of the content item. For example, the data processing system can transmit the content item without the messaging identifier. The data processing system 120 can include a messaging icon in the content item. Responsive to actuation of the messaging icon via the computing device 110 (e.g., a selection, rollover, keyboard input, or touch gesture), the data processing system 120 can provide the messaging identifier to the computing device 110 to cause the computing device 110 to launch a messaging application 155.

The data processing system 120 can transmit the first instance of the online content item with the messaging identifier to a computing device to cause the computing device to render the instance of the online content item with the messaging identifier on a display of the first computing device. A user of the computing device 110 can click or otherwise select the messaging identifier, which can include a tag or other instruction to cause the messaging application 155 to launch or execute on the computing device 110. The content item can further including instructions to insert or predetermined text or characters in one or more electronic messages transmitted by the messaging application 155. For example, the content item can include an instructions to inset a unique identifier of the content item along with one or more electronic messages transmitted by the computing device responsive to the computing device rendering the content item.

The messaging application 155 executing on the computing device 110 can establish an asynchronous network-based communication session or communication channel with the data processing system 120 or messaging system 115 or other device. The messaging application 155 can establish a different communication session or communication channel with the messaging system 115. The messaging application 155 can establish a secure communication channel with the data processing system 120. The messaging application 155 can provide different information to the data processing system 120 as compared to the messaging system 115 or directly to a destination communication device 110.

The messaging application 155 can use push technology to provide electronic messages or real-time text, which can transmit messages character by character or word-by-word, as they are composed in the messaging application 155 by a user of the computing device 110. For example, a user may input text into an input text box 335 of the messaging application or may use a voice interface to input text into the messaging application 155. The messaging application 155 can stream or transmit the inputted text to the data processing system 120 as the text is being input into the messaging application 155. The messaging application 155 can stream the text via the connection or communication channel established between the computing device 110 and the data processing system 120.

The data processing system 120 can include an intermediary appliance 140. The intermediary appliance 140 can include hardware, software, or a combination of hardware and software. The intermediary appliance 140 can include a bridge service or switchboard. The intermediary appliance 140 can provide a virtual switchboard, such as a switchboard executed by a virtual server. The intermediary appliance 140 can be part of the data processing system 120 or separate from the data processing system 120. The intermediary appliance 140 can interact with the data processing system 120 via network 105.

The intermediary appliance 140 can be located on the asynchronous network-based communication channel in between the computing device 110 and the content provider device 125. For example, the asynchronous network-based communication channel can refer to a network route traversed by the electronic message between the computing device 110 and the content provider device 125. The electronic message may travel from the computing device 110 to an internet service provider system or cell phone provider system, and then to a network gateway, one or more network nodes, a content provider 125 server or system, and then a content provider device 125. The intermediary appliance 140 can be located on the channel such that the electronic message is intercepted by the intermediary appliance 140. The intermediary appliance 140 can intercept data, network packets, data packets or other data structures including the electronic message.

The intermediary appliance 140 can configure the electronic message for interception by assigning a proxy messaging identifier to the messaging identifier, where the proxy messaging identifier routes or forwards electronic messages to the intermediary appliance 140 before the content provider device 125. The intermediary appliance 140 can then route or forward the electronic message to the content provider 125 corresponding to the proxy messaging identifier. Thus, the intermediary appliance 140 can intercept an electronic message transmitted over the asynchronous network-based communication channel between the first computing device and the content provider device.

The data processing system 120 can include a quality sensor component 145. The quality sensor component 145 can determine, based on a characteristic of the electronic message intercepted by the intermediary appliance, a quality of the asynchronous network-based communication channel. Based on this quality, the data processing system 120 can instruct the content generator component to add, remove, update, or otherwise modify a parameter of the content item. For example, the quality sensor component 145 can instruct the content generator component 135 to block insertion of the messaging identifier in a subsequent or second instance of the online content item prior to transmission of the second instance of the online content item to a second computing device. Thus, the quality sensor component 145 can prevent additional computing devices from accessing the messaging identifier and transmitting electronic messages to the content provider if the quality is low or below a threshold in order to reduce the aggregate latency in message response times across multiple asynchronous network-based communication channels, reduce latency in message response times for a single asynchronous network-based communication channel, reduce network bandwidth utilization, or reduce processor utilization and load on a messaging service.

The data processing system 120 can determine one or more characteristics of or associated with the electronic message, one or more previously transmitted electronic messages (e.g., between the computing device and the content provider, or other computing devices and the content provider), or characteristics associated with the computing device or content provider. Characteristics can include, for example, a response time, an imbalance metric, a spam metric, a sentiment metric, or other value or feature indicative of a quality of the asynchronous network-based communication channel or status of the content provider device 125.

For example, the data processing system 120 can determine a characteristic that includes a response time. The response time can indicate the amount of time a content provider device 125 takes to respond to an electronic message transmitted by the computing device 110. The response time can be an initial response time, response time per-electronic message, average response time, average response time for the last N number of messages (e.g., where N is a number such as 3, 4, 5, 6, 10, or 15), maximum response time, minimum response time, difference between a maximum response time and a minimum response time, or difference in response times of the computing device 110 versus the content provider device 125. The data processing system 120 can generate a model based on the response times to identify a trend in the response time, such as an increase in latency which can indicate the content provider device 125 is approaching its capacity.

To determine the response time, the data processing system 120 can receive a timestamp associated with the electronic message. The timestamp can be a send timestamp, receive timestamp, or timestamp of when the electronic message was actually viewed, rendered, displayed, or read on a device (e.g., based on an interaction with the messaging application 155 that indicates that a user of the messaging application 155 likely viewed or read the electronic message).

The data processing system 120 can compare the response time with a threshold to determine a quality or status of the electronic message, asynchronous network-based communication channel, computing device 110, or content provider device 125. The threshold can be fixed or dynamic. The threshold can be stored in threshold data structure 165. The threshold can be a predetermined threshold established by the data processing system 120, content provider 125, or computing device 110. The threshold can be dynamic and vary based on a parameter associated with the asynchronous network-based communication, content provider device 125 or computing device 110. For example, the data processing system 120 can select a threshold based on a location of a device, distance between the computing device 110 and the content provider device 125, distance between the computing device 110 and a physical establishment of content provider 125, or mode of transportation of the computing device 110. The data processing system 120 can select a threshold based on a sentiment of the electronic messages or topic of the electronic messages. For example, if the topic or nature of the electronic message is time sensitive (e.g., emergency services, medical services, taxi service, car towing company, car repair, or plumbing), the data processing system 120 may establish a lower threshold as compared to non-time sensitive communications (e.g., booking travel arrangements, ordering flowers, or buying shoes or clothes). The response time threshold can include, for example, 1 minute, 2 minutes, 3 minutes, 4 minutes, 5 minutes, 10 minutes, 30 minutes, 60 minutes, 2 hours, 3 hours, 5 hours, 6 hours, 12 hours, 24 hours, or more).

If the response time (e.g., for a single electronic message or an average response time over the last N number of messages between the content provider 125 and a single computing device 110, or an average response time between the content provider and multiple computing devices 110) is greater than the response time threshold, the data processing system 120 can determine that the quality is low. The data processing system 120 can have different categories of quality. Categories can include low, medium, high; numeric score; letter grades; symbols; or colors (e.g., green, yellow, orange, or red). If the response time is greater than the response time threshold, the data processing system 120 can determine the quality is low. Responsive to determining the quality is based on the response time greater than the threshold, the data processing system 120 can block the messaging identifier from insertion in subsequent instances of the content item.

The data processing system 120 can block insertion of the messaging identifier for a predetermined time interval. The time interval may allow the content provider device 125 to process backlogged network traffic data and return to steady state where the device can process electronic messages in a timely manner that satisfies the response time threshold.

The data processing system 120 can block insertion of messaging identifiers until the quality improves. For example, the data processing system 120 can continue to monitor characteristics associated with the electronic messages and determine the quality or status on an on-going or periodic basis (e.g., every N number of electronic messages; every 1 minute, 5 minutes, or 10 minutes). If the quality improves, the data processing system 120 can enable insertion of the messaging identifier in subsequent instances of the content item.

The data processing system 120 can determine the characteristic of the electronic message to include an imbalance metric. The imbalance metric an refer to or indicate a difference in the number of electronic messages sent by the computing device 110 as compared to the content provider device 125. For example, if the computing device 110 transmits 10 electronic messages for every 1 electronic message transmitted by the content provider device 125, the data processing system 120 can determine an imbalance metric as the ratio 1 to 10 or number 0.1, or ratio 10 to 1 or number 10. The data processing system 120 can compare this imbalance metric with a threshold to determine the quality. For example, if the imbalance metric is the decimal 0.1 (e.g., 1 divided by 10), and the imbalance threshold is 0.3, the data processing system 120 can determine that the imbalance metric for the asynchronous network-based communication channel falls below the threshold, which can indicate a low quality channel. This might indicate that computing devices 110 are sending many messages, but the content provider device 125 is not able to keep up and timely respond to each message.

If the imbalance metric is the ratio 10 to 1, then the imbalance threshold can be 3, and the data processing system 120 can determine a low quality channel if the imbalance metric is greater than the threshold.

The imbalance metric can be determined for a single asynchronous network-based communication channel (e.g., between a single computing device 110 and content provider 125), between a single content provider device 125 and aggregated over multiple computing devices 110, or aggregated between multiple content provider devices 125 associated with the content provider or messaging identifier and multiple computing devices 110.

The data processing system 120 can block, responsive to the quality based on the comparison of the imbalance metric with the imbalance threshold, the messaging identifier from insertion in subsequent instances of the content item for a time interval.

The data processing system 120 can determine the characteristic of the electronic message to include a spam metric. The spam metric can indicate that the content provider device 125 is sending unwanted or unsolicited electronic messages to the computing device 110. Sending unwanted or unnecessary messages can increase bandwidth usage, processor utilization, affect latency for other wanted messages, or drain battery of a computing device 110.

The data processing system 120 can determine the spam metric based on a number of electronic messages transmitted by the content provider device 125 over a time interval in which the computing device does not transmit an electronic message to the content provider device. For example, if the last electronic transmitted by the computing device 110 was more than 2 hours ago, and the content provider 125 continues to send electronic messages at a rate of 5 per hour, then the data processing system 120 can determine this is spam.

The spam metric can be determined based on a combination a time interval since the last electronic message transmitted by the computing device 110, rate of electronic messages transmitted by the content provider device 125, or a number of electronic messages transmitted by the content provider device 125. The data processing system 120 can block, responsive to a quality based on the comparison of the spam metric with the spam threshold, the messaging identifier from insertion in subsequent instances of the content item for a time interval.

The data processing system 120 can model aspects or characteristics of the electronic messages to identify malicious activity. The data processing system 120 can determine that an electronic message includes spam based on identifying a malicious hyperlink in an electronic message transmitted by the content provider. For example, the content provider device 125 may insert a hyperlink to a malicious program, malware, spyware, application, website, or phishing scheme. The data processing system 120 can identify the hyperlink as malicious based on comparing the hyperlink or other identifier with a list of untrusted or unauthorized hyperlinks. The data processing system 120 can identify the hyperlink as malicious by loading the resource corresponding to the hyperlink, parsing the resource, and determining that the resource is malicious or otherwise unauthorized based on keywords or other subject matter on the malicious resource. Upon identifying malicious hyperlinks, the data processing system 120 can determine the hyperlink includes spam and indicate the channel or message is of low quality.

The data processing system 120 can determine the characteristic of the electronic message to include a sentiment metric. A sentiment metric can refer to a sentiment of the channel. The data processing system 120 can determine the sentiment of the channel based on keywords, phrases, topics, or concepts in the electronic messages. For example, if the computing device 110 transmits an electronic message that indicates they are frustrated, then the data processing system 120 can assign a low quality to the channel. The data processing system 120 can determine this sentiment by analyzing keywords of the electronic message. For example, phrases such as "what is taking so long to respond?", "hello??", "I'm still waiting", "where are you?", "this is taking too long", or "this is bad service" can indicate a negative sentiment and low quality. In some cases, the computing device 110 can indicate sentiment based on providing other feedback, such as a positive or negative feedback via messaging application 155, an indication or score of quality.

The characteristic can match a category in a hierarchical categorization structure. The hierarchical categorization structure can include low, medium, or high categories (or other levels). For example, "this is taking too long" can indicate long response time which matches the low quality category, and the data processing system can determine the quality based on the characteristic matching this category.

The data processing system 120 can further identify keywords in electronic messages to identify low quality, such as proper spelling by the content provider 125, grammar usage of the content provider 125, o profanity. The data processing system 120 can block, responsive to the quality, the messaging identifier from insertion in subsequent instances of the content item for a time interval.

The data processing system 120 can identify keywords in electronic messages to identify high quality. For example, the data processing system 120 can identify keywords related to ordering a product or service via the electronic messages, such as "processing order". An indication of high quality message can cause the data processing system 120 to allow the messaging identifier to be inserted in content item objects.

Thus, the quality sensor component 145 can block insertion of the messaging identifier from subsequent instances of the content item to prevent additional computing devices from accessing the messaging identifier and transmitting electronic messages to the content provider in order to reduce the aggregate latency in message response times across multiple asynchronous network-based communication channels, reduce latency in message response times for a single asynchronous network-based communication channel, reduce network bandwidth utilization, or reduce processor utilization and load on a messaging service. For example, the content generator component 135 can transmit the second or subsequent instance of the online content item to a second computing device to cause the second computing device to render the second instance of the online content item without the messaging identifier to prevent the second computing device from transmitting messages to the content provider device via the asynchronous network-based communication channel.

FIG. 2 is an illustration of an electronic document 200 that includes a content item object 215 having a messaging extension 220. The content item object 215 can be provided or rendered for display alongside other content, such as search results 225 or on a content page such as an article or blog. The content item object 215 can be selected based on or responsive to keywords of the webpage, such as keywords entered into the search engine 205 input text interface 210, or responsive to search results 225. In this case, the keyword is "anniversary flowers", and the data processing system 120 selected an ad or content item object 215 for a content provider that is a florist. The data processing system 120 can include a hyperlink 235 to the landing page of the content provider. The data processing system 120 can include the messaging identifier 230 or a messaging icon 220. The data processing system 120 may not include the messaging identifier 230 for rendering or for display on the computing device 110. However, the data processing system 120 may embed the messaging identifier or otherwise associate the messaging identifier with the messaging icon 220 such that actuation or selection of the messaging icon 220 displays or provides the messaging identifier 230, or inserts the messaging identifier 230 into a messaging application executed by the computing device.

Figure 3A:
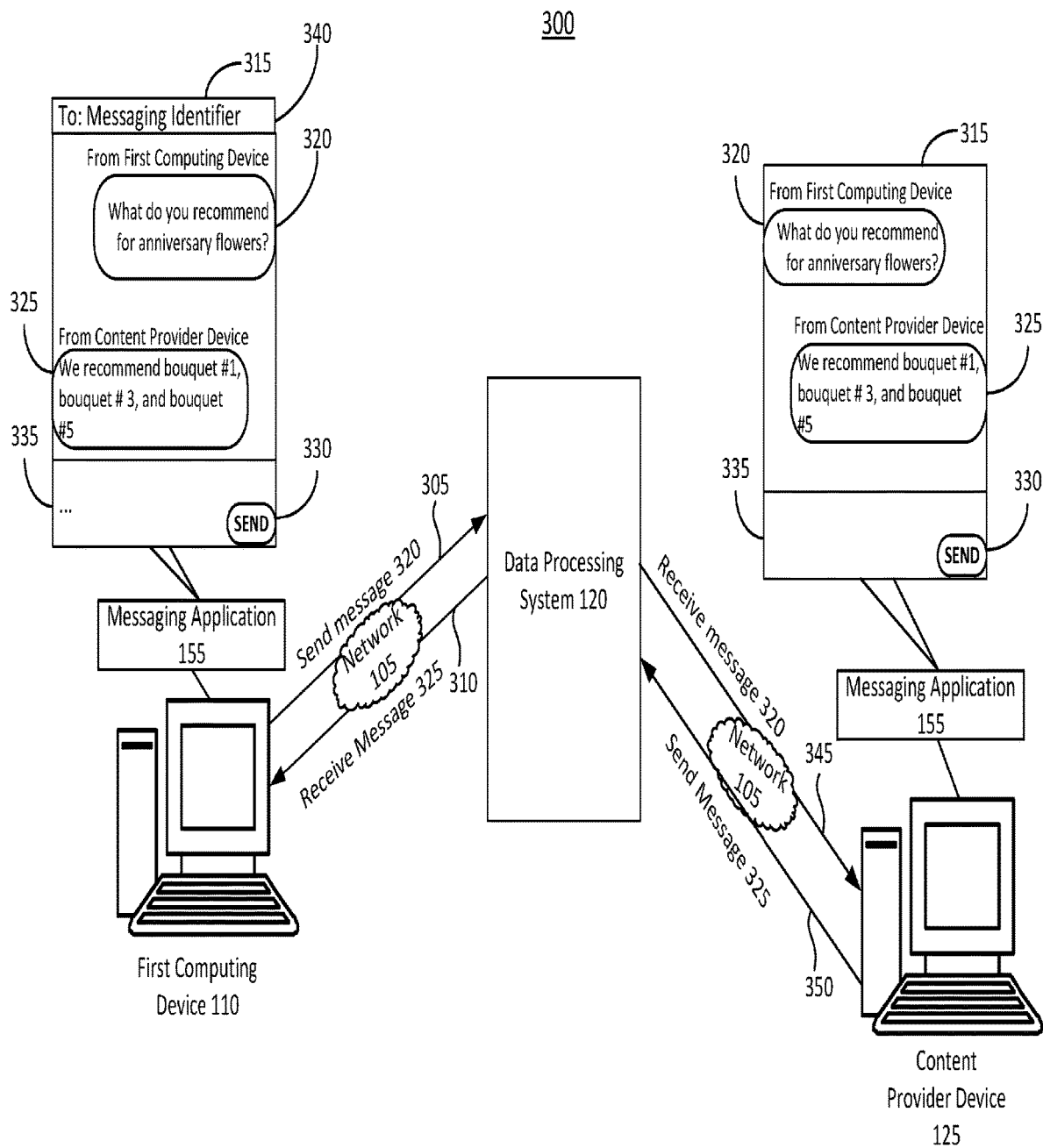
FIG. 3A is a flow diagram illustrating operation of a system for reduction of latency in network traffic data transmissions in accordance with an implementation.

FIG. 3A is a flow diagram illustrating an example operation of a system 300 for reduction of latency in network traffic data transmissions. The system 100 can include one or more components or elements depicts in system 100. A first computing device 110 executes a messaging application 155 that provides messaging user interface 315. A content provider device 125 executes a messaging application 155 that provides messaging user interface 315. The data processing system 120 can intercept or receive the electronic messages and forward them to the computing device 110 or content provider device 125.

For example, computing device 110 can receive a messaging identifier 340 from data processing system 120 responsive to actuation of a messaging icon in a content item object. The computing device 110 can receive, via user interface 315 of messaging application 115, an input text "What do you recommend for anniversary flowers". The computing device 110 can transmit, responsive to actuation of a send button 330, the electronic message to the content provider device 125 corresponding to the messaging identifier.

The data processing system 120 can intercept the electronic message. For example, the messaging identifier 340 can be assigned to the data processing system 120 as a proxy messaging identifier. Thus, the computing device 110 may send message 320 to data processing system 120 via transmission 305. The data processing system 120 can then forward the electronic message to the content provider device 125 via transmission 345.

The content provider device 125 can render the electronic message 320 for display via user interface 315 of messaging application 155. The content provider device 125 can receive, via user interface 315, an electronic message 325 (e.g., "we recommend bouquet #1, bouquet #3, and bouquet #5) to send to computing device 110. The content provider device 125 can send the electronic message 325 via transmission 350 to the data processing system 120. The data processing system 120 can forward the electronic message 325 to computing device 110 via transmission 310. The computing device 110 can render electronic message 325 on user interface 315 of messaging application 155 executed by computing device 110.

The asynchronous network-based communication channel can include or be formed of transmissions or network paths 305, 345, 350, and 310. This may be asynchronous because it is not a phone or video call. This may be asynchronous because a next transmission 350 is not sent until a previous transmission 345 is received. For example, an operation begins upon receipt of an indication (signal) that the preceding operation has been completed.

Figure 3B:
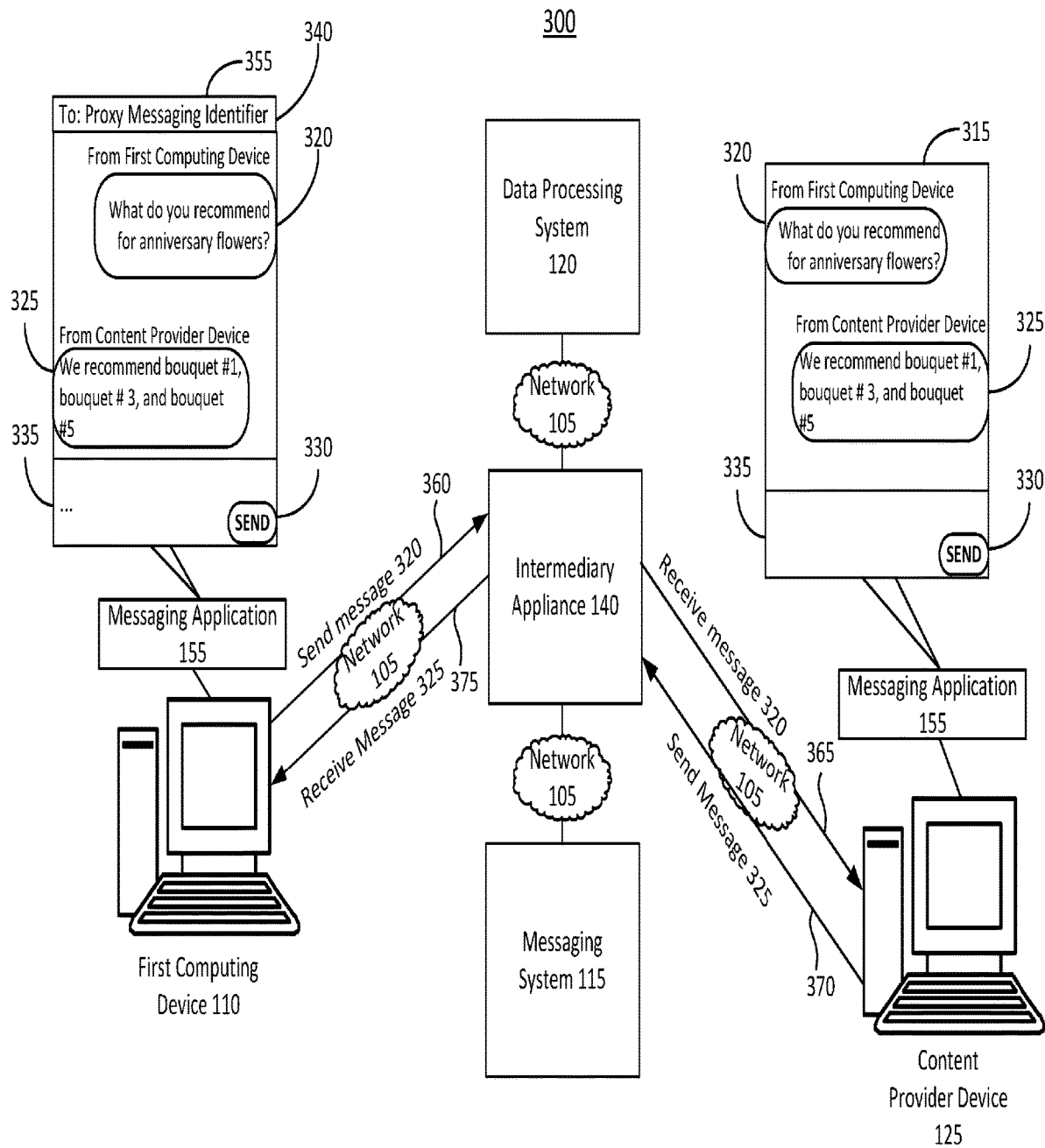
FIG. 3B is a flow diagram illustrating operation of a system for reduction of latency in network traffic data transmissions in accordance with an implementation.

FIG. 3B is a flow diagram illustrating operation of the system 300 for reduction of latency in network traffic data transmissions. The system 300 can include one or more components of system 100. In system 300, an intermediary appliance 140 is separate from the data processing system 120. The intermediary appliance 140 can include hardware or software or a combination of hardware and software. The intermediary appliance 140 can include a gateway, bridge, routing switch, cell phone provider, or other intermediary server or component that is in the communication path in between a computing device 110 and content provider device 125. The intermediary appliance 140 can interface or communicate with the data processing system 120 and the messaging system 115. For example, the messaging system 115 can share access to channels or electronic messages with the intermediary appliance 140. The intermediary appliance 140 can insert a proxy messaging number for original messaging identifiers assigned by the messaging identifier. For example, a content provider 125 can establish a username with the messaging system 115 (e.g., for an online chat platform). The intermediary appliance 140 can receive the username information, apply a hash function to the username and generate a unique hash value that corresponds to or is mapped to the username in a hash table stored by the intermediary appliance 140. The intermediary appliance 140 can further select a virtual messaging identifier or proxy messaging identifier for the hash value. The intermediary appliance 140 can have access to a pool of available proxy messaging identifiers. These messaging identifiers can be referred to as a proxy or a virtual messaging identifier because they route or forward electronic messages to the intermediary appliance 140 as opposed to directly to the content provider device 125 or messaging system 115 corresponding to the original messaging identifier.

The data processing system 120 can insert the proxy messaging identifier as the messaging identifier in the content item object or the messaging icon. The computing device 110 can transmit an electronic message 320 to the proxy messaging identifier 355 via messaging application 155. The intermediary appliance 140 can receive the electronic message 230 via transmission 360. The intermediary appliance 140 can receive the electronic message 320. The intermediary appliance 140 can perform a lookup for the proxy message identifier in the hash table to identify an original messaging identifier of the content provider device 125. The intermediary appliance 140 can forward the electronic message 320 to content provider device 125 via transmission 365. The content provider device 125 can respond by sending electronic message 325 via transmission 370 back to the intermediary appliance 140 since the intermediary appliance can insert, as the response identifier, a proxy messaging identifier that corresponds to the intermediary appliance 140. The intermediary appliance 140 can perform a lookup in the hash table to identify the original messing identifier of the computing device 110 that corresponds to the proxy messaging identifier. The intermediary appliance 140 can forward the electronic message 325 to computing device 110 via transmission 375. The asynchronous network-based communication channel can include or be formed from the path and electronic messages associated with transmissions 380, 385, 390 and 395.

Figure 3C:
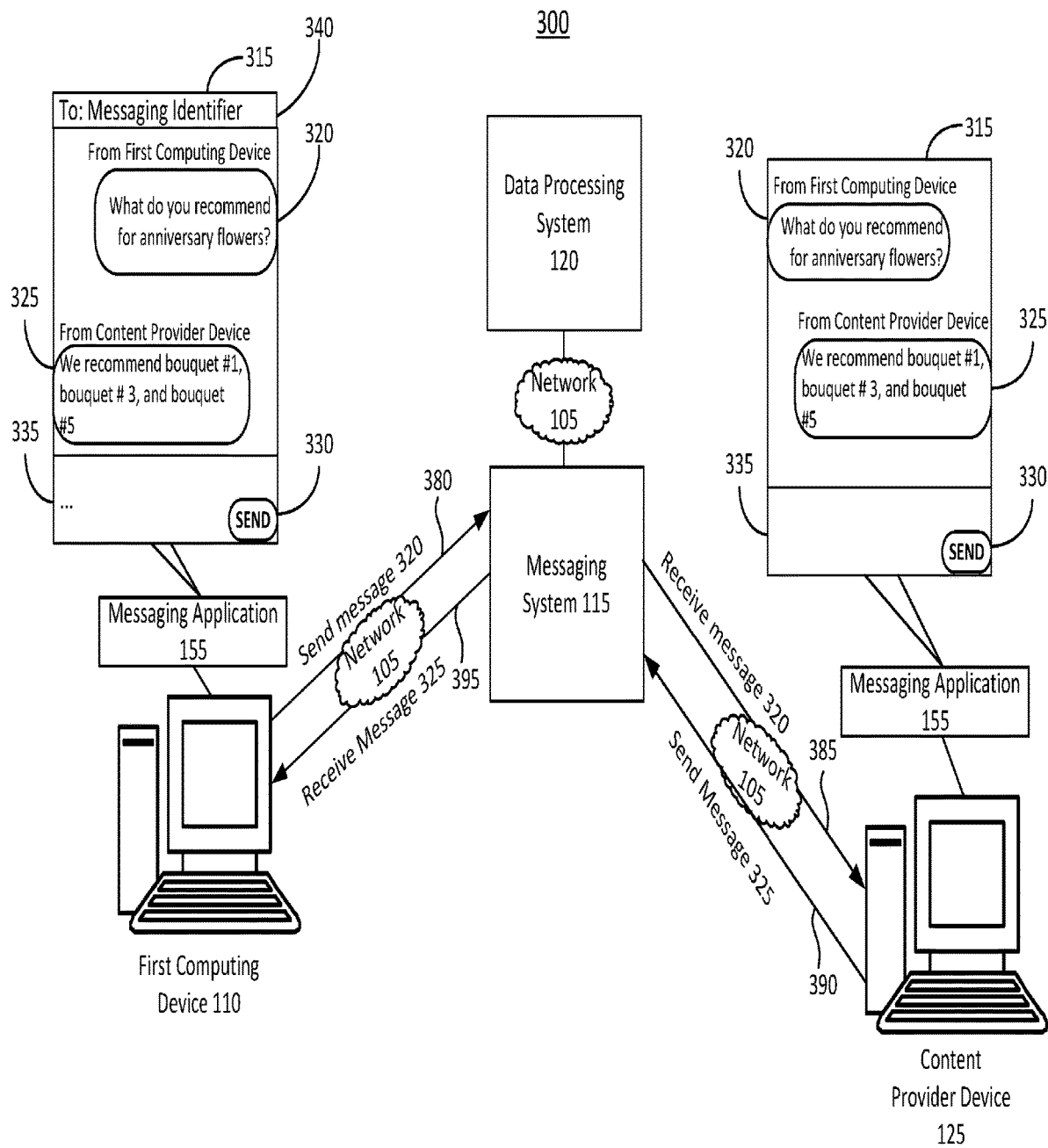
FIG. 3C is a flow diagram illustrating operation of a system for reduction of latency in network traffic data transmissions in accordance with an implementation.

FIG. 3C is a flow diagram illustrating an example operation of a system 300 for reduction of latency in network traffic data transmissions. The system 300 includes a messaging system 115 that interfaces with the data processing system 120 via network 105. The messaging system 115 can send and receive electronic messages 320 and 325 via transmissions 380, 385, 390 and 395 between computing device 110 and content provider device 125. The messaging system 115 can provide the data processing system 120 with access to the electronic messages and other characteristics associated with the channel established by transmissions 380, 385, 390 and 395.

The messaging system 115 can assign a unique hash value to the channel formed form transmissions or paths 380, 385, 390 and 395. The messaging system 115 can determine the hash value by, for example, applying a hash function to an original messaging identifier of the computing device 110 and the content provider device 125, or by otherwise combining these identifiers. The data processing system 120 can request information or characteristics of the channel from the messaging system 115 using the unique identifier assigned to the channel. The data processing system 120 can receive or intercept electronic messages via messaging system 115, or access messaging system 115 for information about the electronic messages.

Figure 4:
FIG. 4 is an illustration of a method of reducing latency in network traffic data transmissions in accordance with an implementation.

FIG. 4 is an illustration of an example method for reduction of latency in network traffic data transmissions. The method 400 can be performed by one or more component, system or element of system 100 or system 300. The method 400 can include a data processing system parsing an online document at 405. The data processing system can access a database to obtain a template at 410. The data processing system can insert a messaging identifier at 415. The data processing system can transmit a first instance of a content item at 420. The data processing system can intercept an electronic message at 425. The data processing system can determine a quality of the message or channel at 430. The data processing system can instruct a content generator based on the quality at 435. The data processing system can transmit a second instance of the content item at 440.

At 405, the data processing system parses an online document at 405. The data processing system can parse the online document to determine a messaging identifier used to communicate over an asynchronous network-based communication channel with a content provider device. The data processing system can use or apply one or more rules to determine or identify a messaging identifier. The data processing system can identify a prominent messaging identifier, such as a messaging identifier that is more likely than other messaging identifiers to be associated with a content provider device.

At 410, the data processing system can access a database to obtain a template. The content item can be established or provided by a content provider. The template can include information about the content item, such as a hyperlink, text, keywords, images, or fields. The data processing system can access a database stored in memory to obtain the template for an online content item linked to the content provider. The data processing system can perform a lookup in a data structure to identify the template for the content item or content provider. The data processing system can perform a lookup using an identifier of the content provider.

The fields in the template can be populated by the data processing system. The fields can be populated by the data processing system at the time of selecting the content item or transmitting the content item for rendering on a computing device. The data processing system can insert values, text, icons, or other data in the fields.

At 415, the data processing system can insert a messaging identifier into a field of the template. The data processing system can insert into a field of the template, the messaging identifier determined via the online document analysis component to assemble a first instance of the online content item. The data processing system can populate the field with the messaging identifier, or an icon that is tagged with metadata indicating the messaging identifier.

The data processing system can transmit a first instance of a content item at 420. The data processing system can transmit the first instance of the online content item with the messaging identifier to a first computing device to cause the first computing device to render the first instance of the online content item with the messaging identifier on a display of the first computing device.

At 425, the data processing system can intercept an electronic message at 425. The data processing system can intercept the electronic message via an intermediary appliance. The intermediary appliance can be located on the asynchronous network-based communication channel in between the first computing device and the content provider device associated with the messaging identifier. The electronic message can be transmitted over the asynchronous network-based communication channel between the first computing device and the content provider device.

At 430, the data processing system can determine a quality of the message or channel. The data processing system can determine the quality based on characteristics of messages associated with the content provider. Characteristics can include response time, latency, number of messages, imbalance, or sentiment.

The data processing system can instruct a content generator based on the quality at 435. The data processing system can instruct the content generator component to block insertion of the messaging identifier in a second instance of the online content item prior to transmission of the second instance of the online content item to a second computing device. The data processing system can block or prevent insertion of the messaging identifier to prevent additional computing devices from accessing the messaging identifier and transmitting electronic messages to the content provider in order to reduce the aggregate latency in message response times across multiple asynchronous network-based communication channels, reduce latency in message response times for a single asynchronous network-based communication channel, reduce network bandwidth utilization, or reduce processor utilization and load on a messaging service or system.

The data processing system can transmit a second instance of the content item at 440. The data processing system can transmit the second instance of the online content item to the second computing device to cause the second computing device to render the second instance of the online content item without the messaging identifier to prevent the second computing device from transmitting messages to the content provider device via the asynchronous network-based communication channel.

Figure 5:
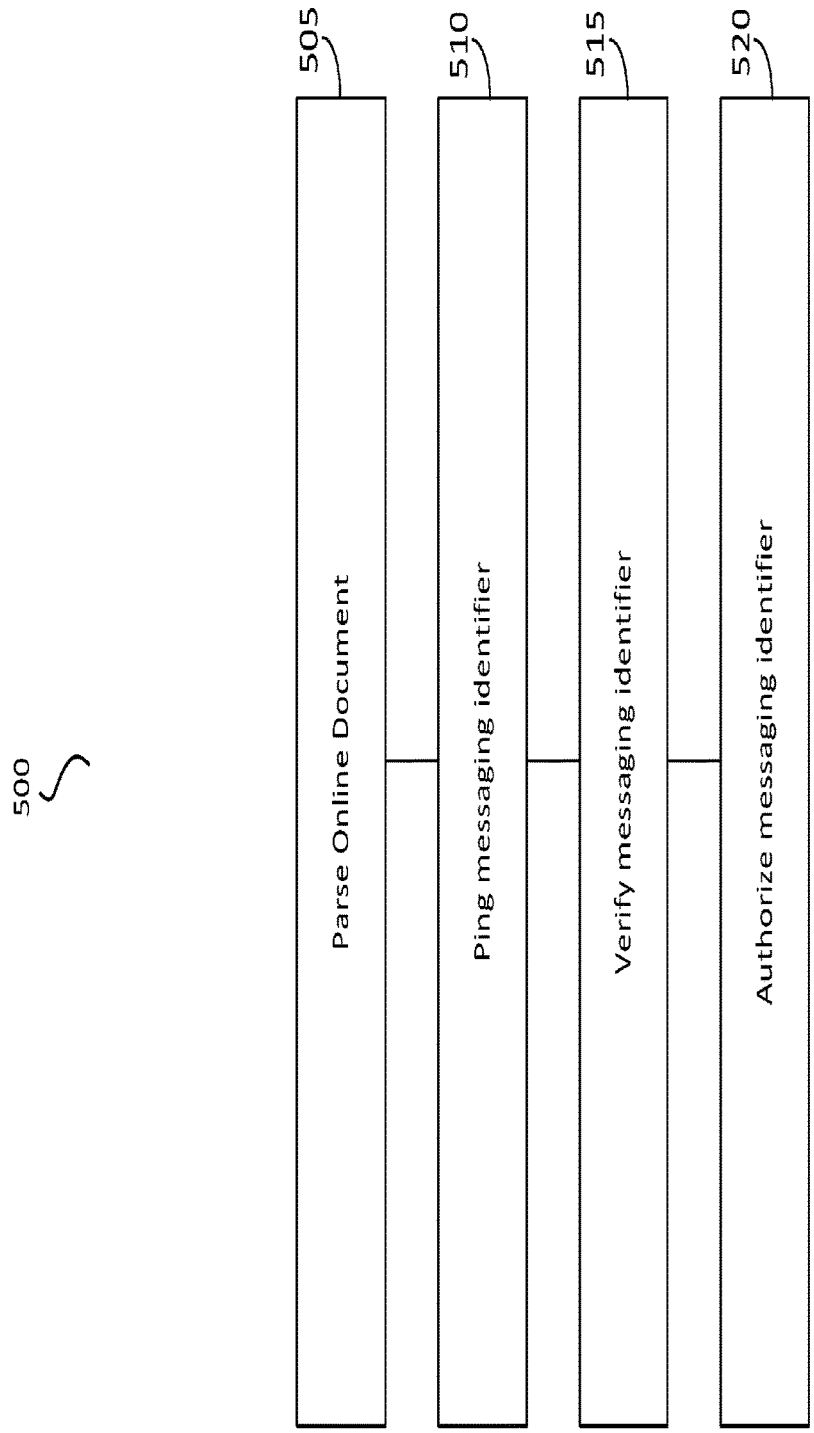
FIG. 5 is an illustration of a method for authorizing a messaging identifier in accordance with an implementation.

FIG. 5 is an illustration of an example method for authorizing a messaging identifier. The method 500 can be performed by one or more component, module or system of system 100 or system 300. At 505, a data processing system can parse an online document or resource. The data processing system can identify a messaging identifier in the online document. The data processing system can use a prominence score to identify the messaging identifier.

At 510, the data processing system can ping the messaging identifier, or a device corresponding to the messaging identifier. For example, the data processing system can interface with a messaging application to transmit an electronic message to the messaging identifier.

At 515, the data processing system can verify the messaging identifier. The data processing system can receive a response from the device corresponding to the messaging identifier. The response can be an acceptable response or an unacceptable response. The response can be a predetermined response. The response can be in a format that complies with an electronic messaging standard.

The data processing system can verify the response based on a quality check or other criteria. The data processing system can verify that the response complies with the standard for electronic messages or the type of channel being used. The data processing system can verify that the response includes the correct predetermined text. For example, the data processing system can send an initial message to the content provider that includes text "Can your device receive and respond to electronic messages? If so, respond with 'yes'". The content provider device can respond with text "yes". The data processing system can determine the response matches the expected response, and then verify the messaging identifier.

The data processing system can determine whether the response is an automated response generated by a software program, such as a bot, or a response generated by a human. If the data processing system determines that the response is generated by a chat bot or is otherwise an automated response, the data processing system can determine not to authorize the messaging identifier. The data processing system can determine the response is automated using various techniques. For example, the data processing system can include, in the initial test electronic message, a Turing test or Completely Automated Public Turing ("CAPTCHA") test. The data processing system 120 can authorize the messaging identifier if the response from the content provider device 125 satisfies the test. The data processing system can perform the Turing or CAPTCHA test upon initiating or authorizing the messaging identifier. The data processing system can perform the Turing or CAPTCHA test periodically during an ongoing asynchronous network-based communication channel to determine whether a bot has inserted itself into the transmissions.

At 520, the data processing system can authorize the messaging identifier for insertion into content item objects. The data processing system can store the status of the messaging identifier in a content data data structure. The data processing system can authorize, responsive to verification of the content provider device, a content generator component to insert the messaging identifier in one or more instances of the content item.

Figure 6:
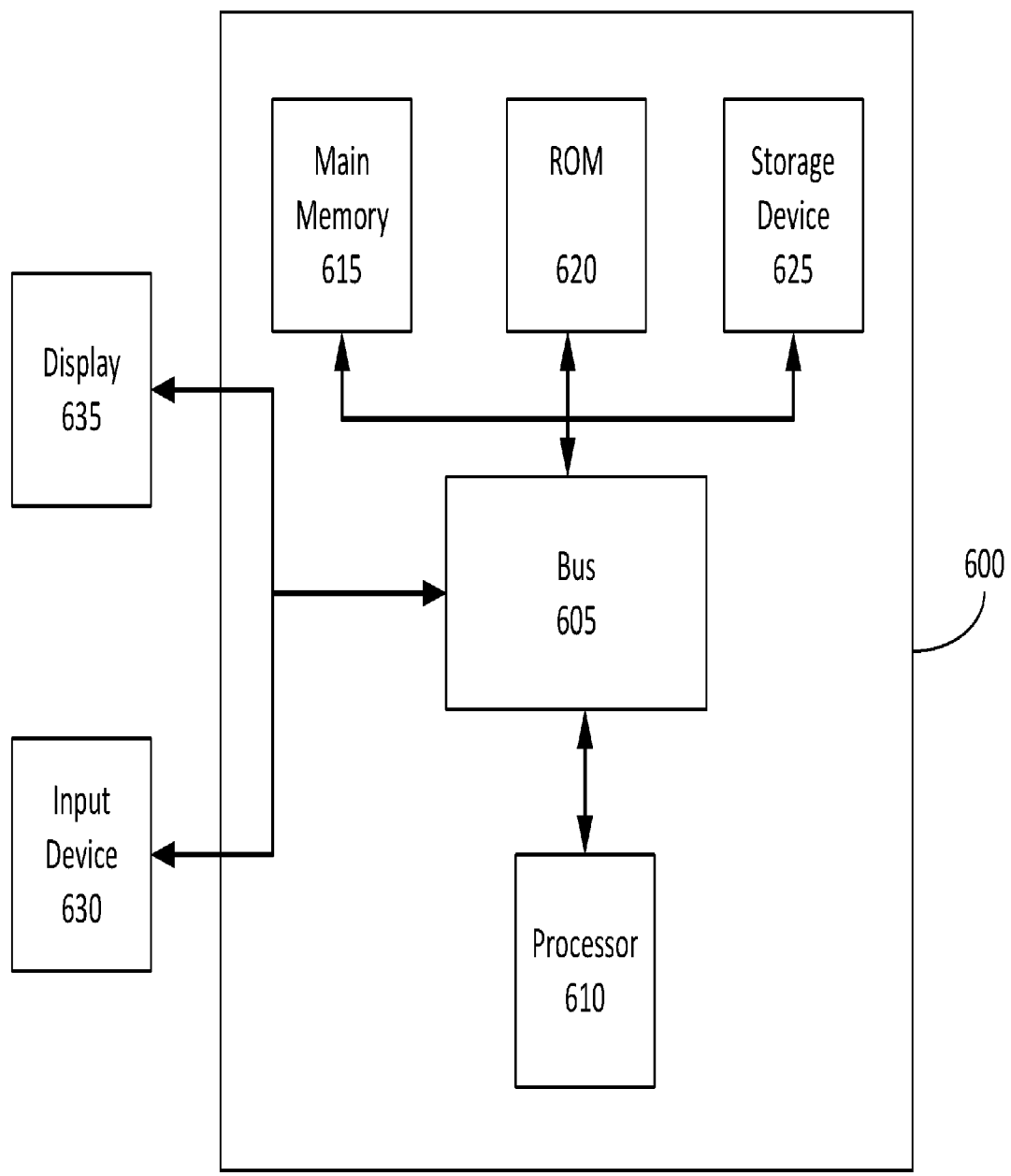
FIG. 6 is a block diagram illustrating a general architecture for a computer system that can be employed to implement various elements of the systems shown in FIGS. 1, 2, 3A, 3B, 3C, and methods shown in FIGS. 4 and 5 in accordance with an implementation.

FIG. 6 is a block diagram of an example computer system 600. The computer system or computing device 600 can include or be used to implement the system 100, content provider 125, computing device 110, messaging system 115, data processing system 120, online document analysis component 130, content generator component 135, intermediary appliance 140, quality sensor component 145, and data repository 145. The computing system 600 includes a bus 605 or other communication component for communicating information and a processor 610 or processing circuit coupled to the bus 605 for processing information. The computing system 600 can also include one or more processors 610 or processing circuits coupled to the bus for processing information. The computing system 600 also includes main memory 615, such as a random access memory (RAM) or other dynamic storage device, coupled to the bus 605 for storing information, and instructions to be executed by the processor 610. The main memory 615 can be or include the data repository 155. The main memory 615 can also be used for storing position information, temporary variables, or other intermediate information during execution of instructions by the processor 610. The computing system 600 may further include a read only memory (ROM) 620 or other static storage device coupled to the bus 605 for storing static information and instructions for the processor 610. A storage device 625, such as a solid state device, magnetic disk or optical disk, is coupled to the bus 605 for persistently storing information and instructions. The storage device 625 can include or be part of the data repository 155.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information and command selections to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 can be part of the computing device 110 or other component of FIG. 1, for example.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter and the functional operations described in this specification can be implemented in other types of digital electronic circuitry, or in computer software, firmware, or hardware, including the structures disclosed in this specification and their structural equivalents, or in combinations of one or more of them.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific details, these should not be construed as limitations on the scope of any inventions or of what may be claimed, but rather as descriptions of features specific to particular examples. Certain features described separately in this specification can be implemented in combination. Conversely, various features described together can be implemented separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the examples described above should not be understood as requiring such separation in all instances, and it should be understood that the described program components and systems can generally be integrated in a single software product or packaged into multiple software products.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'.

Where technical features in the drawings, detailed description or any claim are followed by reference identifiers, the reference identifiers have been included to increase the intelligibility of the drawings, detailed description, or claims. Accordingly, neither the reference identifiers nor their absence have any limiting effect on the scope of any claim elements.

Thus, particular implementations of the subject matter have been described. Other implementations are within the scope of the following claims. The actions recited in the claims can be performed in a different order and still achieve desirable results. The processes depicted in the accompanying figures do not necessarily require the particular order shown, or sequential order, to achieve desirable results. For example, the data processing system 120 or other components can multitask operations, for example be implementing parallel processing techniques.

What is claimed is:

1. A system to balance network traffic load to reduce latency of network traffic data, comprising:
　a data processing system having a processor and a memory, comprising:
　an online document analysis component parsing an online document to determine a messaging identifier used to communicate over an asynchronous network-based communication channel between a first computing device and a content provider device, wherein:
　　the messaging identifier identifies the content provider device, and
　　the messaging identifier is a verified messaging identifier that is indicative of an operational status of the content provider device to receive electronic messages over the asynchronous network-based communication channel;
　an intermediary appliance, located on the asynchronous network-based communication channel, intercepting an electronic message including the messaging identifier in a first instance of an online content item, assigning a proxy identifier to the messaging identifier, and routing the electronic message to the content provider device corresponding to the proxy identifier, the messaging identifier used to initiate a text message or a chat over the asynchronous network-based communication channel;
　a quality sensor component determining, based on a characteristic of the electronic message intercepted by the intermediary appliance, a quality of the asynchronous network-based communication channel; and
　a content generator component blocking, responsive to the determining of the quality, insertion of the messaging identifier in a second instance of the online content item prior to transmission of the second instance of the online content item to a second computing device, the content generator component transmitting the second instance of the online content item to the second computing device without the messaging identifier.

2. The system of claim 1, comprising the online document analysis component to:
　apply a rule to subject matter parsed in the online document to determine a prominence of at least a portion of the subject matter; and
　determine, based on the prominence, the messaging identifier as including the at least the portion of the subject matter.

3. The system of claim 1, comprising the online document analysis component to:
　apply a machine learning technique to subject matter parsed in the online document to determine a prominence of at least a portion of the subject matter; and
　determine, based on the prominence, the messaging identifier as including the at least the portion of the subject matter.

4. The system of claim 1, wherein the messaging identifier is a first messaging identifier, the system comprising the online document analysis component to:
　parse a first online document to identify an embedded hyperlink to a second online document;
　access the second online document using the embedded hyperlink to parse subject matter of the second online document;
　determine, based on the subject matter parsed in the second online document, a second messaging identifier;
　apply a rule to the first messaging identifier to determine a first prominence;
　apply the rule to the second messaging identifier to determine a second prominence; and
　select, based on a comparison of the first prominence and the second prominence, the first messaging identifier for insertion in the first instance of the online content item.

5. The system of claim 1, wherein the messaging identifier includes at least one of a phone number, icon, username, button, handle, or tag.

6. The system of claim 1, comprising the quality sensor component to:
　ping, prior to insertion of the messaging identifier in the first instance of the online content item, via the asynchronous network-based communication channel, the content provider device corresponding to the messaging identifier;
　receive, from the content provider device, a response to the ping;
　verify, based on the response, that the content provider device is operational to receive the electronic messages over the asynchronous network-based communication channel; and
　authorize, responsive to verification of the content provider device, the content generator component to insert the messaging identifier in one or more instances of the online content item.

7. The system of claim 1, comprising the content generator component to:
　retrieve, from a database stored in the memory, a plurality of messaging identifiers linked to an online account associated with the content provider device, the plurality of messaging identifiers authorized for the electronic messages; and
　determine, based on a comparison of the messaging identifier with the plurality of messaging identifiers, to update the database storing the plurality of messaging identifiers to include the messaging identifier and authorize the messaging identifier for the electronic messages.

8. The system of claim 7, comprising the content generator component to:
　determine, subsequent to updating the database to include the messaging identifier, removal of the messaging identifier from the online document; and
　update, responsive to determining the removal of the messaging identifier from the online document, the database storing the plurality of messaging identifiers to remove the messaging identifier to block the messaging identifier from subsequent insertion in subsequent instances of the online content item.

9. The system of claim 1, comprising the quality sensor component to:
use a unique identifier generated by a hash function that identifies the asynchronous network-based communication channel to monitor the electronic messages transmitted over the asynchronous network-based communication channel.

10. The system of claim 9, comprising the quality sensor component to:
receive the electronic messages from a messaging service provider.

11. The system of claim 1, wherein the characteristic of the electronic message comprises a response time, the system comprising the quality sensor component to:
determine the response time from the content provider device;
determine the quality based on the response time from the content provider device greater than a response time threshold; and
block, responsive to the quality based on the response time greater than the response time threshold, the messaging identifier from subsequent insertion in subsequent instances of the online content item for a time interval.

12. The system of claim 1, wherein the characteristic of the electronic message comprises an imbalance metric, the system comprising the quality sensor component to:
determine the imbalance metric of the asynchronous network-based communication channel based on a first number of the electronic messages sent by a computing device and a second number of the electronic messages sent by the content provider device within a first time interval;
determine the quality based on a comparison of the imbalance metric with an imbalance threshold; and
block, responsive to the quality based on the comparison of the imbalance metric with the imbalance threshold, the messaging identifier from subsequent insertion in subsequent instances of the online content item for a second time interval.

13. The system of claim 1, wherein the characteristic of the electronic message comprises a spam metric, the system comprising the quality sensor component to:
determine the spam metric based on a number of the electronic messages transmitted by the content provider device over a first time interval in which a computing device does not transmit the electronic message to the content provider device;
determine the quality based on a comparison of the spam metric with a spam threshold; and
block, responsive to the quality based on the comparison of the spam metric with the spam threshold, the messaging identifier from subsequent insertion in subsequent instances of the online content item for a second time interval.

14. The system of claim 1, wherein the characteristic of the electronic message comprises a sentiment metric, the system comprising the quality sensor component to:
determine the characteristic of the electronic message based on parsing the electronic message and a plurality of the electronic messages transmitted between the content provider device and a computing device;
determine the quality based on the characteristic matching a category in a hierarchical categorization structure; and
block, responsive to the quality, the messaging identifier from subsequent insertion in subsequent instances of the online content item for a time interval.

15. A method of balancing network traffic load to reduce latency of network traffic data, comprising:
parsing, by an online document analysis component, an online document to determine a messaging identifier used to communicate over an asynchronous network-based communication channel between a first computing device and a content provider device, wherein:
the messaging identifier identifies the content provider device, and
the messaging identifier is a verified messaging identifier that is indicative of an operational status of the content provider device to receive electronic messages over the asynchronous network-based communication channel;
intercepting, by an intermediary appliance located on the asynchronous network-based communication channel, intercepting an electronic message including the messaging identifier in a first instance of an online content item, the messaging identifier used to initiate a text message or a chat over the asynchronous network-based communication channel;
assigning, by the intermediary appliance, a proxy identifier to the messaging identifier;
routing, by the intermediary appliance, the electronic message to the content provider device corresponding to the proxy identifier;
determining, by a quality sensor component executed by a data processing system, based on a characteristic of the electronic message intercepted by the intermediary appliance, a quality of the asynchronous network-based communication channel;
blocking, by a content generator component, responsive to the determining of the quality, insertion of the messaging identifier in a second instance of the online content item prior to transmission of the second instance of the online content item to a second computing device; and
transmitting, by the content generator component, the second instance of the online content item to the second computing device without the messaging identifier.

16. The method of claim 15, comprising:
applying, by the online document analysis component, a rule to subject matter parsed in the online document to determine a prominence of at least a portion of the subject matter; and
determining, by the online document analysis component based on the prominence, the messaging identifier as including the at least the portion of the subject matter.

17. The method of claim 15, comprising:
applying, by the online document analysis component, a machine learning technique to subject matter parsed in the online document to determine a prominence of at least a portion of the subject matter; and
determining, by the online document analysis component based on the prominence, the messaging identifier as including the at least the portion of the subject matter.

18. The method of claim 15, comprising:
pinging, by the quality sensor component prior to insertion of the messaging identifier in the first instance of the online content item, via the asynchronous network-based communication channel, the content provider device corresponding to the messaging identifier;
receiving, by the quality sensor component, from the content provider device, a response to the pinging;

verifying, by the quality sensor component based on the response, that the content provider device is operational to receive the electronic messages over the asynchronous network-based communication channel; and authorizing, by the quality sensor component, responsive to verification of the content provider device, the content generator component to insert the messaging identifier in one or more instances of the online content item.

19. The method of claim 15, comprising:

retrieving, by the content generator component, from a database stored in memory, a plurality of messaging identifiers linked to an online account associated with the content provider device, the plurality of messaging identifiers authorized for the electronic messages; and determining, by the content generator component, based on a comparison of the messaging identifier with the plurality of messaging identifiers, to update the database storing the plurality of messaging identifiers to include the messaging identifier and authorize the messaging identifier for the electronic messages.

20. The method of claim 15, wherein the characteristic of the electronic message comprises a response time, the method comprising:

determining, by the quality sensor component, the response time from the content provider device;

determining, by the quality sensor component, the quality based on the response time from the content provider device greater than a response time threshold; and blocking, by the quality sensor component, responsive to the quality based on the response time greater than the response time threshold, the messaging identifier from subsequent insertion in subsequent instances of the online content item for a time interval.

* * * * *